US012090481B2

(12) United States Patent
Zhou

(10) Patent No.: US 12,090,481 B2
(45) Date of Patent: Sep. 17, 2024

(54) MICROFLUIDIC SYSTEM INCLUDING COOLING DEVICE

(71) Applicant: Applied Cells Inc., Santa Clara, CA (US)

(72) Inventor: Yuchen Zhou, San Jose, CA (US)

(73) Assignee: Applied Cells Inc., Santa Clara, CA (US)

( * ) Notice: Subject to any disclaimer, the term of this patent is extended or adjusted under 35 U.S.C. 154(b) by 830 days.

(21) Appl. No.: 17/167,744

(22) Filed: Feb. 4, 2021

(65) Prior Publication Data

US 2022/0134342 A1 May 5, 2022

Related U.S. Application Data

(60) Provisional application No. 63/109,264, filed on Nov. 3, 2020.

(51) Int. Cl.

| | |
|---|---|
| ***B01L 3/00*** | (2006.01) |
| ***B03B 1/00*** | (2006.01) |
| ***F25B 21/02*** | (2006.01) |
| ***F25D 17/06*** | (2006.01) |
| ***F25D 19/00*** | (2006.01) |

(52) U.S. Cl.

CPC .......... *B01L 3/502761* (2013.01); *B03B 1/00* (2013.01); *F25B 21/02* (2013.01); *B01L 2200/0652* (2013.01); *B01L 2300/0809* (2013.01); *B01L 2300/1805* (2013.01); *B01L 2300/1822* (2013.01); *B01L 2300/1833* (2013.01); *B01L 2300/1844* (2013.01); *B01L 2300/1894* (2013.01); *B01L 2400/0436* (2013.01); *F25B 2321/0251* (2013.01)

(58) Field of Classification Search

CPC ....... B01L 3/502761; B01L 2200/0652; B01L 2300/0809; B01L 2300/1805; B01L 2300/1822; B01L 2300/1833; B01L 2300/1844; B01L 2300/1894; B01L 2400/0436; B03B 1/00; F25B 21/02; F25B 2321/0251

See application file for complete search history.

(56) References Cited

U.S. PATENT DOCUMENTS

| | | | | |
|---|---|---|---|---|
| 3,555,297 | A * | 1/1971 | Pierson | B06B 3/00 310/325 |
| 4,759,775 | A | 7/1988 | Peterson et al. | |
| 5,902,489 | A | 5/1999 | Yusada et al. | |
| 5,972,721 | A | 10/1999 | Bruno et al. | |
| 6,216,538 | B1 | 4/2001 | Yasuda et al. | |
| 6,254,830 | B1 | 7/2001 | Pivarnik et al. | |
| 6,929,750 | B2 | 8/2005 | Laurell et al. | |
| 7,348,185 | B2 | 3/2008 | Yamamichi | |
| 7,474,184 | B1 | 1/2009 | Humphries et al. | |
| 7,591,302 | B1 * | 9/2009 | Lenehan | H01L 23/473 165/104.33 |
| 7,781,202 | B2 | 8/2010 | Yamamichi | |
| 8,273,302 | B2 | 9/2012 | Takahashi et al. | |
| 8,309,408 | B2 | 11/2012 | Ward et al. | |
| 8,573,060 | B2 | 11/2013 | Huang et al. | |
| 8,636,906 | B2 | 1/2014 | Stein | |
| 8,956,536 | B2 | 2/2015 | Yu et al. | |
| 8,986,944 | B2 | 3/2015 | Yamanishi et al. | |
| 9,095,494 | B2 | 8/2015 | Warner et al. | |
| 9,109,197 | B2 | 8/2015 | Yasuda et al. | |
| 9,217,131 | B2 | 12/2015 | Lamish et al. | |
| 9,272,234 | B2 | 3/2016 | Lipkens et al. | |
| 9,476,855 | B2 | 10/2016 | Ward et al. | |
| 9,510,998 | B2 | 12/2016 | Warner et al. | |
| 9,513,205 | B2 | 12/2016 | Yu et al. | |
| 9,551,643 | B2 | 1/2017 | Warner et al. | |
| 9,656,263 | B2 | 5/2017 | Laurell et al. | |
| 9,725,690 | B2 | 8/2017 | Presz et al. | |
| 9,745,569 | B2 | 8/2017 | Lipkens et al. | |
| 9,796,956 | B2 | 10/2017 | Lipkens et al. | |
| 9,835,540 | B2 | 12/2017 | Yu et al. | |
| 9,885,642 | B2 | 2/2018 | Yu | |

(Continued)

FOREIGN PATENT DOCUMENTS

| | | | |
|---|---|---|---|
| WO | 2019142343 | 7/2019 | |
| WO | WO-2019142343 A1 * | 7/2019 | B01L 7/00 |

OTHER PUBLICATIONS

Kosuke et al. Description translation. (Year: 2018).*
Kosuke et al. Claims translation (Year: 2018).*
European Search Report for Application No. EP21185413.
Petersson et al., Separation of lipids from blood utilizing ultrasonic standing waves in microfludic channels, Analyst, 2004, 938-943, vol. 129.
Jonsson et al., Particle separation using ultrasound can radically reduce embolic load to brain after cardiac surgery, The Annals of Thoracic Surgery, 2004, 1572-1578, vol. 78.
Petrov et al., Electrically controlled integrated optical filter, Technical Physics Letters, 2004, 120-122, vol. 30.
Xia et al., Combined microfluidic-micromagnetic separation of living cells in continuous flow, Biomedical Microdevices, 2006, 299-308, vol. 8.

(Continued)

*Primary Examiner* — Titilayo Moloye
*Assistant Examiner* — Gillian C. Reglas
(74) *Attorney, Agent, or Firm* — Bing K. Yen

(57) ABSTRACT

A microfluidic system for separating biological entities includes a cooling device including a thermoelectric heat pump, a first fan, and a first heat exchanger disposed between the first fan and the thermoelectric heat pump; a first housing structure having a first shell that encases the first fan and the first heat exchanger; a microfluidic device and one or more piezoelectric transducers attached thereto; and a second housing structure reversibly attached to the first housing structure and having a second shell that encloses therein the microfluidic device and the one or more piezoelectric transducers. When the first and second housing structures are coupled, a first air passage is formed between a side of the first heat exchanger and an end of the microfluidic device, a second air passage is formed between the first fan and the piezoelectric transducers, thereby allowing air to circulate between the first and second air passages.

18 Claims, 12 Drawing Sheets

(56) References Cited

U.S. PATENT DOCUMENTS

| | | | | |
|---|---|---|---|---|
| 10,045,913 | B2 | 8/2018 | Warner et al. | |
| 10,052,431 | B2 | 8/2018 | Dreschel et al. | |
| 10,173,220 | B2 | 1/2019 | Middlebrook et al. | |
| 10,444,125 | B2 | 10/2019 | Yu | |
| 10,449,553 | B2 * | 10/2019 | Zhou | B03C 1/0332 |
| 10,677,695 | B2 | 6/2020 | Koyata et al. | |
| 10,710,006 | B2 | 7/2020 | Lipkens et al. | |
| 10,724,029 | B2 | 7/2020 | Lipkens et al. | |
| 2004/0069708 | A1 | 4/2004 | Laurell et al. | |
| 2005/0106064 | A1 | 5/2005 | Laurell et al. | |
| 2006/0094051 | A1 | 5/2006 | Lee et al. | |
| 2006/0204950 | A1 * | 9/2006 | Ilercil | A01N 1/0273 435/284.1 |
| 2006/0240572 | A1 | 10/2006 | Carron et al. | |
| 2007/0182517 | A1 | 8/2007 | Humphries et al. | |
| 2008/0160630 | A1 | 7/2008 | Liu et al. | |
| 2008/0302732 | A1 | 12/2008 | Soh et al. | |
| 2009/0052273 | A1 | 2/2009 | Sarvazyan | |
| 2009/0065359 | A1 | 3/2009 | Zhou | |
| 2010/0317093 | A1 | 12/2010 | Turewicz et al. | |
| 2011/0033922 | A1 | 2/2011 | Landers et al. | |
| 2012/0100546 | A1 | 4/2012 | Lowery et al. | |
| 2012/0122731 | A1 | 5/2012 | Soh et al. | |
| 2012/0295302 | A1 | 11/2012 | Lamish et al. | |
| 2013/0265054 | A1 | 10/2013 | Lowery et al. | |
| 2013/0330739 | A1 | 12/2013 | Yu | |
| 2014/0120570 | A1 | 5/2014 | Yu et al. | |
| 2014/0231315 | A1 | 8/2014 | Laurell et al. | |
| 2015/0010939 | A1 | 1/2015 | Warner et al. | |
| 2015/0177111 | A1 | 6/2015 | Warmer et al. | |
| 2015/0253226 | A1 | 9/2015 | Augustsson et al. | |
| 2015/0308971 | A1 | 10/2015 | Bisgaard et al. | |
| 2016/0252445 | A1 | 9/2016 | Yu et al. | |
| 2018/0348097 | A1 | 12/2018 | Abbott et al. | |
| 2019/0029247 | A1 | 1/2019 | Bauer et al. | |
| 2019/0390250 | A1 | 12/2019 | Wilson et al. | |
| 2021/0310914 | A1 * | 10/2021 | Kunc | G01N 1/286 |

OTHER PUBLICATIONS

Radisic et al., Micro- and nanotechnology in cell separation, International Journal of Nanomedicine, 2006, 3-14, vol. 1.
Pamme et al., Continuous sorting of magnetic cells via on-chip free-flow magnetophoresis, Lab on a Chip, 2006, 974-980, vol. 6.
Laurell et al., Chip integrated strategies for acoustic separation and manipulation of cells and particles, Chemical Society Reviews, 2007, 492-506, vol. 36.
Riethdorf et al., Detection of circulating tumor cells in peripheral blood of patients with metastatic breast cancer: A validation study of the CellSearch system, Clinical Cancer Research, 2007, 920-928, vol. 13.
June, Carl H., Adoptive T cell therapy for cancer in the clinic, The Journal of Clinical Investigation, 2007, 1466-1476, vol. 117.
Pamme, Nicole, Continuous flow separations in microfluidic devices, Lab on a Chip, 2007, 1644-1659, vol. 7.
Riley et al., Human T regulatory cell therapy: Take a billion or so and call me in the morning, Immunity, 2009, 656-665, vol. 30.
Tsutsui et al., Cell separation by non-inertial force fields in microfluidic systems, Mechanics Research Communications, 2009, 92-103, vol. 36.
Lenshof, Andreas, Acoustic standing wave manipulation of particles and cells in microfluidic chips, Doctoral Thesis, 2009, Lund University, Lund, Sweden.
Yu et al., Circulating tumor cells: approaches to isolation and characterization, The Journal of Cell Biology, 2018, 373-382, vol. 192.
Utz et al., Microfluidic waves, Lab on a Chip, 2011, 3846-3854, vol. 11.
Dykes et al., Efficient removal of platelets from peripheral blood progenitor cell products using a novel micro-chip based acoustophoretic platform, PLOS One, 2011, e23074, vol. 6.
Augustsson et al., Microfluidic label-free enrichment of prostate cancer cells in blood based on acoustophoresis, Analytical Chemistry, 2012, 7954-7962, vol. 84.
Kandilov et al., The national market for medicare clinical laboratory testing: implications for payment reform, Medicare & Medicaid Research Review, 2012, e1-e21, vol. 2.
Barnkob et al., Acoustic radiation- and streaming-induced microparticle velocities determined by micro-PIV in an ultrasound symmetry plane, Physical Review E, 2012, 056307, vol. 86.
Tajudin et al., Integrated acoustic immunoaffinity-capture (IAI) platform for detection of PSA from whole blood samples, Lab on a Chip, 2013, 1790-1796, vol. 13.
Burguillos et al., Microchannel acoustophoresis does not impact survival or function of microglia, leukocytes or tumor cells, PLOS One, 2013, e64233, vol. 8.
Singh et al., Manufacture of clinical-grade CD 19-specific T cells stably expressing chimeric antigen receptor using sleeping beauty system and artificial antigen presenting cells, PLOS One, 2013, e64138, vol. 8.
Lenshof et al., Efficient purification of CD4+ lymphocytes from peripheral blood progenitor cell products using affinity bead acoustophoresis, Cytometry Part A, 2014, 933-941, vol. 85A.
Ilie et al., "Sentinel" circulating tumor cells allow early diagnosis of lung cancer in patients with chronic obstructive pulmonary disease, PLOS One, 2014, e111597, vol. 9.
Matsueda et al., Immunotherapy in gastric cancer, World Journal of Gastroenterology, 2014, 1657-1666, vol. 20.
Grenvall et al., Concurrent isolation of lymphocytes and granulocytes using prefocused free flow acoustophoresis, Analytical Chemistry, 2015, 5596-5604, vol. 87.
Jakobsson et al., Thousand-fold volumetric concentration of live cells with a recirculating acoustofluidic device, Analytical Chemistry, 2015, 8497-8502, vol. 87.
Fong et al., A microfluidic platform for precision small-volume sample processing and its use to size separate biological particles with an acoustic microdevice, Journal of Visualized Experiments, 2015, e53051, vol. 105.
Shields et al., Microfluidic cell sorting: a review of the advances in the separation of cells from debulking to rare cell isolation, Lab on a Chip, 2015, 1230-1249, vol. 15.
Temiz et al., Lab-on-a-chip devices: how to close and plug the lab?, Microelectronic Engineering, 2015, 156-175, vol. 132.
Hahn et al., A numerically efficient damping model for acoustic resonances in microfluidic cavities, Physics of Fluids, 2015, 062005, vol. 27.
Poruk et al., Circulating tumor cell phenotype predicts recurrence and survival in pancreatic adenocarcinoma, Annals of Surgery, 2016, 1073-1081, vol. 264.
Jansson et al., Prognostic impact of circulating tumor cell apoptosis and clusters in serial blood samples from patients with metastatic breast cancer in a prospective observational cohort, BMC Cancer, 2016, 433, vol. 16.
Banys-Paluchowski et al., Circulating tumor cells in breast cancer—current status and perspectives, Critical Reviews in Oncology/Hematology, 2016, 22-29, vol. 97.
Urbansky et al., Affinity-bead-mediated enrichment of CD8+ lymphocytes from peripheral blood progenitor cell products using acoustophoresis, Micromachines, 2016, 101, vol. 7.
Chen et al., Cancer statistics in China, 2015, CA: A Cancer Journal for Clinicians, 2016, 115-132, vol. 66.
Magnusson et al., Clinical-scale cell-surface-marker independent acoustic microfluidic enrichment of tumor cells from blood, Analytical Chemistry, 2017, 11954-11961, vol. 89.
Boffa et al., Cellular expression of PD-L1 in the peripheral blood of lung cancer patients is associated with worse survival, Cancer Epidemiology, Biomarkers & Prevention, 2017, 1139-1145, vol. 26.
Cui, Mingyang, Particle enrichment in longitudinal standing bulk acoustic wave microfluidics, Master Thesis, 2017, Washington University, St. Louis, Missouri.
Eyer et al., Single-cell deep phenotyping of IgG-secreting cells for high-resolution immune monitoring, Nature Biotechnology, 2017, 977-982, vol. 35.

(56) References Cited

OTHER PUBLICATIONS

Fachin et al., Monolithic chip for high-throughput blood cell depletion to sort rare circulating tumor cells, Scientific Reports, 2017, 10936, vol. 7.
Cushing et al., Reducing WBC background in cancer cell separation products by negative acoustic contrast particle immuno-acoustophoresis, Analytica Chimica Acta, 2018, 256-264, vol. 1000.
Vormittag et al., A guide to manufacturing CAR T cell therapies, Current Opinion in Biotechnology, 2018, 164-181, vol. 53.
Yu et al., An integrated enrichment system to facilitate isolation and molecular characterization of single cancer cells from whole blood, Cytometry Part A, 2018, 1226-1233, vol. 93A.
Leipold et al., Comparison of CyTOF assays across sites: Results of a six-center pilot study, Journal of Immunological Methods, 2018, 37-43, vol. 453.
Abdlaty et al., Hyperspectral imaging: comparison of acousto-optic and liquid crystal tunable filters, Proceedings of SPIE, Medical Imaging 2018: Physics of Medical Imaging, 105732P, vol. 10573.
Bhagwat et al., An integrated flow cytometry-based platform for isolation and molecular characterization of circulating tumor single cells and clusters, Scientific Reports, 2018, 5035, vol. 8.
Kulasinghe et al., Capture of circulating tumor cell clusters using straight microfluidic chips, Cancers, 2019, 89, vol. 11.
Das et al., Naive T cell deficits at diagnosis and after chemotherapy impair cell therapy potential in pediatric cancers, Cancer Discovery, 2019, 492-499, vol. 9.
Chen et al., Next-generation sequencing in liquid biopsy: cancer screening and early detection, Human Genomics, 2019, 34, vol. 13.
Urbansky et al., Label-free separation of leukocyte subpopulations using high throughput multiplex acoustophoresis, Lab on a Chip, 2019, 1406, vol. 19.
Chemi et al., Pulmonary venous circulating tumor cell dissemination before tumor resection and disease relapse, Nature Medicine, 2019, 1534-1539, vol. 25.
Liu et al., Epithelial-type systemic breast carcinoma cells with a restricted mesenchymal transition are a major source of metastasis, Science Advances, 2019, eaav4275, vol. 5.
Xu et al., Correlation of pulmonary venous circulating tumor cells with clinicopathological parameters in patients with early-stage lung adenocarcinoma, Translational Cancer Research, 2019, 887-898, vol. 8.
Daieff, Marine, Acoustic techniques for microfluidic particle sorting, Elveflow Product Brochure, 2020.
Olm, Franziska, Label-free processing of stem cell preparations by acoustophoresis, Doctoral Thesis, Lund University, 2020, Lund, Sweden.
Goda, Keisuke, Intelligent image-activated cell sorting: a tutorial, Handout from International Society for Advancement of Cytometry Webinar on Jan. 8, 2020.
Second-generation micro actuator for better head-positioning accuracy, Hitachi Global Storage Technology Tech Brief, 2017.
Ott et al., An ongoing analysis of a phase IB study of the personal neoantigen vaccine NEO-PV-01 + Nivolumab in patients with metastatic melanoma, NSCLC and bladder cancer, Handout from ESMO Congress, Munich, 2018.
Yasutaka et al., Dual-stage actuator for HDD achieving high-accuracy positioning and wide-bandwidth servo control, Toshiba Review, 2011, vol. 66.
Racila et al., Detection and characterization of carcinoma cells in the blood, Medical Sciences, 1998, 4589-4594, vol. 95.
Iinuma et al., Detection of tumor cells in blood using CD45 magnetic cell separation followed by nested mutant allele-specific amplification of p53 and K-ras genes in patients with colorectal cancer, International Journal of Cancer, 2000, 337-344, vol. 89.
Nilsson et al., Acoustic control of suspended particles in micro fluidic chips, Lab on a Chip, 2004, 131-135, vol. 4.
Petersson et al., Free flow acoustophoresis: microfluidic-based mode of particle and cell separation, Analytical Chemistry, 2007, 5117-5123, vol. 79.
Adams et al., Integrated acoustic and magnetic separation in microfluidic channels, Applied Physics Letters, 2009, 254103, vol. 95.
Adams et al., Tunable acoustophoretic band-pass particle sorter, Applied Physics Letters, 2010, 064103, vol. 97.
Guldiken et al., Sheathless size-based acoustic particle separation, Sensors, 2012, 905-922, vol. 12.
Glynne-Jones et al., Acoustofluidic 23: acoustic manipulation combined with other force fields, Lab on a Chip, 2013, 1003-1010, vol. 13.
Sajeesh et al., Particle separation and sorting in microfluidic devices: a review, Microfluidic Nanofluidic, 2014, 1-52, vol. 17.
Watarai, Hitoshi, Continuous separation principles using external microaction forces, Annual Review of Analytical Chemistry, 2013, 353-378, vol. 6.
Van Assche et al., Gradient acoustic focusing of submicron particles for separation of bacteria from blood lysate, Scientific reports, 2020, 3670, vol. 10.
Antfolk et al., Label-free single-cell separation and imaging of cancer cells using an integrated microfluidic system, 2017, 46507, vol. 7.

* cited by examiner

MICROFLUIDIC SYSTEM INCLUDING COOLING DEVICE

CROSS-REFERENCE TO RELATED APPLICATIONS

The present application claims priority to provisional application No. 63/109,264, filed on Nov. 3, 2020, the content of which is incorporated herein by reference in its entirety.

BACKGROUND

The present invention relates to an apparatus for separating biological entities suspended in a fluid, and more particularly, to embodiments of a microfluidic system that includes a microfluidic device and a heat transfer device for cooling the microfluidic device.

Acoustic particle separation method for extracting or separating various biological entities suspended in a fluid sample, such as blood, is of great interest in biological and biomedical applications. The method uses acoustic radiation pressure generated by a piezoelectric transducer attached to a microfluidic device to segregate particles with different sizes or acoustic contrasts. Since a relatively high power may be applied to the piezoelectric transducer during operation, the heat generated by the transducer may heat the fluid sample flowing through the microfluidic device and damage the biological entities therein. Therefore, the microfluidic device and/or the piezoelectric transducer need to be properly cooled during operation.

For the foregoing reason, there is a need for a compact cooling device that can reliably cool the microfluidic device during operation.

SUMMARY

The present invention is directed to an apparatus that satisfies this need. A microfluidic system for separating biological entities comprises a cooling device including a thermoelectric heat pump, a first fan, a first heat exchanger disposed between the first fan and the thermoelectric heat pump, a second fan, and a second heat exchanger disposed between the second fan and the thermoelectric heat pump; a first housing structure having a first shell that encases the first fan and the first heat exchanger, the first housing structure having first and second cavities that respectively expose two sides of the first heat exchanger and a third cavity formed adjacent to the first fan opposite the first heat exchanger; a microfluidic device and one or more piezoelectric transducers attached thereto; and a second housing structure reversibly attached to the first housing structure and having a second shell that encloses therein the microfluidic device and the one or more piezoelectric transducers, the second housing structure including fourth and fifth cavities that respectively expose two ends of the microfluidic device and a sixth cavity. When the first and second housing structures are coupled, the first and second cavities are respectively aligned to the fourth and fifth cavities to form first and second air passages between the two sides of the first heat exchanger and the two ends of the microfluidic device, the third and sixth cavities are aligned to form a third air passage between the first fan and the one or more piezoelectric transducers, thereby allowing air to circulate between the third air passage and the first and second air passages.

According to another aspect of the present invention, a microfluidic system for separating biological entities comprises a cooling device including a thermoelectric heat pump, a first fan, and a first heat exchanger disposed between the first fan and the thermoelectric heat pump, a second fan, and a second heat exchanger disposed between the second fan and the thermoelectric heat pump; a first housing structure having a first shell that encases the first fan and the first heat exchanger, the first housing structure having a first cavity exposing a side of the first heat exchanger and a second cavity formed adjacent to the first fan opposite the first heat exchanger; a microfluidic device and one or more piezoelectric transducers attached thereto; and a second housing structure reversibly attached to the first housing structure and having a second shell that encloses therein the microfluidic device and the one or more piezoelectric transducers, the second housing structure including a third cavity exposing an end of the microfluidic device and a fourth cavity. When the first and second housing structures are coupled, the first and third cavities are aligned to form a first air passage between the side of the first heat exchanger and the end of the microfluidic device, the second and fourth cavities are aligned to form a second air passage between the first fan and the one or more piezoelectric transducers, thereby allowing air to circulate between the first and second air passages.

BRIEF DESCRIPTION OF THE DRAWINGS

These and other features, aspects, and advantages of the present invention will become better understood with regard to the following description, appended claims, and accompanying drawings where:

For purposes of clarity and brevity, like elements and components will bear the same designations and numbering throughout the Figures, which are not necessarily drawn to scale.

DETAILED DESCRIPTION

Figure 1A:
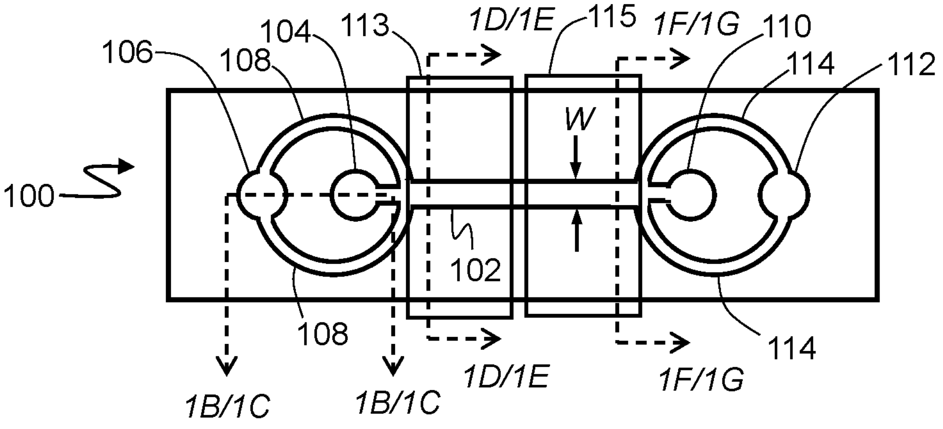
FIG. 1A is a top view of a microfluidic device for separating biological entities in accordance with an embodiment of the present invention.

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "at least" followed by a number is used herein to denote the start of a range beginning with that number, which may be a range having an upper limit or no upper limit, depending on the variable being defined. For example, "at least 1" means 1 or more than 1. The term "at most" followed by a number is used herein to denote the end of a range ending with that number, which may be a range having 1 or 0 as its lower limit, or a range having no lower limit, depending upon the variable being defined. For example, "at most 4" means 4 or less than 4, and "at most 40%" means 40% or less than 40%. When, in this specification, a range is given as "a first number to a second number" or "a first number-a second number," this means a range whose lower limit is the first number and whose upper limit is the second number. For example, "25 to 100 nm" means a range whose lower limit is 25 nm and whose upper limit is 100 nm.

The term "acoustic contrast" may be used herein to mean the relative difference in the density/compressibility ratio between an object and the host medium with regard to the ability to manipulate its position with acoustic radiation pressure. Objects having higher density/compressibility ratios than the host medium may have positive acoustic contrast, which tends to move the objects towards pressure nodes. Conversely, objects having lower density/compressibility ratios than the host medium may have negative acoustic contrast, which tends to move the objects towards pressure antinodes.

The term "biological entities" may be used herein to include cells, bacteria, viruses, molecules, particles including RNA and DNA, cell cluster, bacteria cluster, molecule cluster, and particle cluster.

The term "biological sample" may be used herein to include blood, body fluid, tissue extracted from any part of the body, bone marrow, hair, nail, bone, tooth, liquid and solid from bodily discharge, or surface swab from any part of body. "Entity liquid," or "fluid sample," or "liquid sample," or "sample solution" may include a biological sample in its original liquid form, biological entities being dissolved or dispersed in a buffer liquid, or a biological sample dissociated from its original non-liquid form and dispersed in a buffer fluid. A buffer fluid is a liquid to which biological entities may be dissolved or dispersed without introducing contaminants or unwanted biological entities. Biological entities and biological sample may be obtained from human or animal. Biological entities may also be obtained from plant and environment including air, water and soil. Entity fluid or fluid sample may contain various types of magnetic or optical labels, or one or more chemical reagents that may be added during various steps in accordance with the present invention.

The term "sample flow rate" or "flow rate" may be used herein to represent the volume amount of a fluid sample flowing through a cross-section of a channel, or a fluidic part, or a fluidic path, in a unit time.

The term "relative fraction" may be used herein to represent the ratio of a given quantity of biological entities or particles to all biological entities or particles present in a fluid sample.

An embodiment of the present invention as applied to a microfluidic device for separating particles or biological entities based on physical size and acoustic contrast will now be described with reference to FIGS. 1-2. FIG. 1A is a top view of the microfluidic device 100, which includes a main channel 102, a center inlet port 104 connected to the main channel 102 at the upstream end thereof for introducing a first input fluid into the main channel 102, a side inlet port 106 for introducing a second input fluid into the main channel 102 near the two sidewalls thereof, two side input channels 108 connecting the side inlet port 106 to the main channel 102 at or near the upstream end thereof, a center outlet port 110 connected to the main channel 102 at the downstream end thereof for extracting a first output fluid, a side outlet port 112 for extracting a second output fluid flowing near the two sidewalls of the main channel 102, and two side output channels 114 connecting the side outlet port 112 to the main channel 102 at or near the downstream end thereof. The microfluidic device 100 further includes one or more piezoelectric transducers 113 and 115 for generating the acoustic radiation pressure for acoustic particle separation.

With continuing reference to FIG. 1A, the main channel 102 may have a linear shape with a nominal width, W, between two sidewalls. A portion of the main channel 102 between the center inlet port 104 and the side input channels 108 may be narrower than the nominal width. Likewise, another portion of the main channel 102 between the center outlet port 110 and the side output channels 1114 may be narrower than the nominal width. The width of the side input channels 108 and the width of the side output channels 114 may be narrower than the nominal width of the main channel 102.

The two side input channels 108 connects to the main channel 102 at the two sidewalls thereof, near or at the upstream end. Therefore, the second input fluid, which flows through the two side input channels 108, is introduced into the main channel 102 as two streams flowing near the two sidewalls of the main channel 102. The first input fluid is introduced into the center of the main channel 102 and is squeezed between the two streams of the second input fluid at or near the upstream end of the main channel 102.

The two side output channels 114 connects to the main channel 102 at the two sidewalls thereof, at or near the downstream end. Therefore, the fluid flowing near the two sidewalls at or near the downstream end of the main channel 102 is diverted by the two side output channels 114 to become the second output fluid and exits through the side outlet port 112. The remaining fluid not diverted by the two side output channels 114 becomes the first output fluid and exits through the center outlet port 110.

Figure 1B:
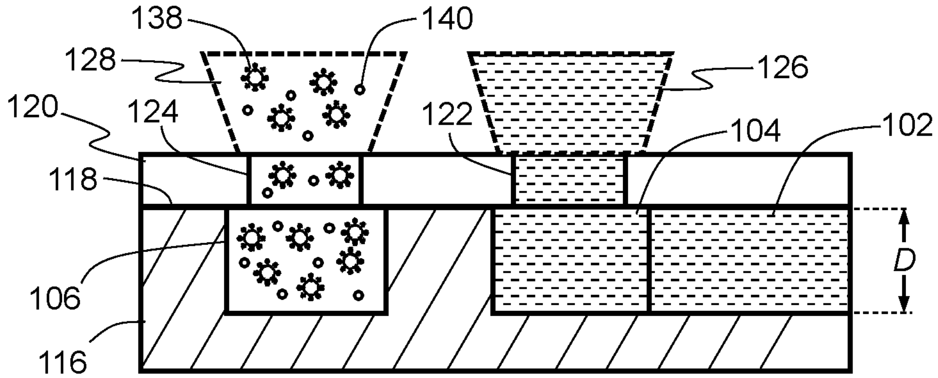
FIGS. 1B and 1C are cross-sectional views of the microfluidic device showing alternative positions of the inlet ports.

FIG. 1B is a cross-sectional view of a portion of the microfluidic device 100 showing the center and side inlet ports 104 and 106 in accordance with an embodiment of the present invention. The above-described features 102-114 of the microfluidic device 100 are recessed into a substrate 116 from a top surface 118 thereof. A substrate lid or cover 120 may be attached to the substrate 116 at the top surface 118 thereof and covers the features 102-114 of the microfluidic device 100. The substrate lid or cover 120 includes two holes or openings 122 and 124 aligned to the center and side inlet ports 104 and 106, respectively. The first input fluid 126 and the second input fluid 128 may respectively flow into the center and side inlet ports 104 and 106 through the openings 122 and 124 in the substrate lid or cover 120. The substrate cover 120 may further include two additional holes or openings (not shown) respectively aligned to the center and side outlet ports 110 and 112 for extracting the first and second output fluids. The main channel 102 may have a nominal channel depth, D, measured from the top surface 118.

Figure 1C:
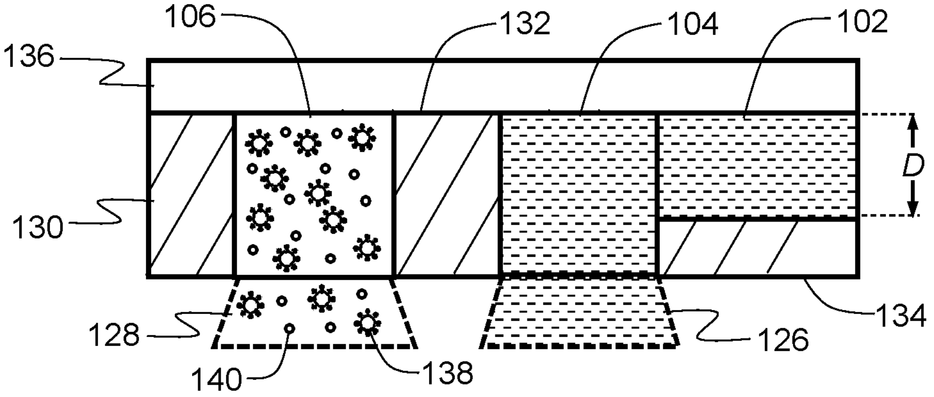

Alternatively, the center and side inlet ports 104 and 106 may be accessed through the bottom of the microfluidic device 100 as shown in the cross-sectional view of FIG. 1C. Like the embodiment shown in FIG. 1B, the channels 102, 108, 114 and ports 104, 106, 110, 112 of the microfluidic device 100 are recessed into a substrate 130 from a top surface 132 thereof. Additionally, the center and side inlet ports 104 and 106 are further extended to perforate a bottom surface 134 of the substrate 130 for receiving the first and second input fluids 126 and 130. The center and side outlet ports 110 and 112 (not shown in FIG. 1C) may also be further extended to perforate the bottom surface 134 of the substrate 130 for outputting the first and second output fluids. A substrate lid or cover 136 may be attached to the substrate 130 at the top surface 132 thereof and covers the channels 102, 108, 114 and ports 104, 106, 110, 112 of the microfluidic device 100.

While FIGS. 1B and 1C show that the first input fluid 126, which may be a buffer fluid, is introduced into the center inlet port 104 and the second input fluid 128, which may contain particles or biological entities for acoustic separation, is introduced into the side inlet port 106, the first and second input fluids 126 and 128 may alternatively be introduced into the side and center inlet ports 106 and 104, respectively, depending on the operation mode of the microfluidic device 100. Moreover, the second input fluid 128 may contain large particles or biological entities 138 and small particles or biological entities 140 for separation by acoustic radiation pressure. Alternatively, the particles or biological entities 138 and 140 may have sufficiently different acoustic contrasts for acoustic separation.

With continuing reference to FIGS. 1A-1C, the substrates 116/130 may comprise any suitable material, such as but not limited to glass, quartz, fused silica, metal, ceramic material, silicon, silicon carbide, aluminum nitride, titanium carbide, aluminum oxide, zirconium oxide, lithium niobate, magnesium oxide, or any combination thereof. The channels 102, 108, 114 and ports 104, 106, 110, 112 may be formed in the substrate 116/130 by removing material therefrom via any suitable method, such as but not limited to water jet machining, mechanical machining, laser machining, wet etching, plasma etching, or any combination thereof. The substrate cover 120/136 may comprise any suitable material, such as but not limited to glass, quartz, fused silica, metal, polymeric material, ceramic material, silicon, silicon carbide, aluminum nitride, titanium carbide, aluminum oxide, zirconium oxide, lithium niobate, magnesium oxide, or any combination thereof. In an embodiment, the substrate 116/130 and the substrate cover 120/136 are made of the same material. The substrate cover 120/136 may be permanently or irreversibly attached to the substrate 116/130 by any suitable bonding method, such as but not limited to adhesive bonding, fusion bonding, anodic bonding, or any combination thereof.

The substrate 116/130 may alternatively comprise a moldable rubber or polymeric material, such as but not limited to polycarbonate or PDMS, that can be molded to form the channels 102, 108, 114 and ports 104, 106, 110, 112 of the microfluidic device 100. When the substrate 116/130 is made of a soft or rubber-like material, such as PDMS or silicone, that lacks structure integrity and may even sag under its own weight, the substrate cover 120/136 made of a relatively stiffer material may be used to support the substrate 116/130.

Figure 1D:
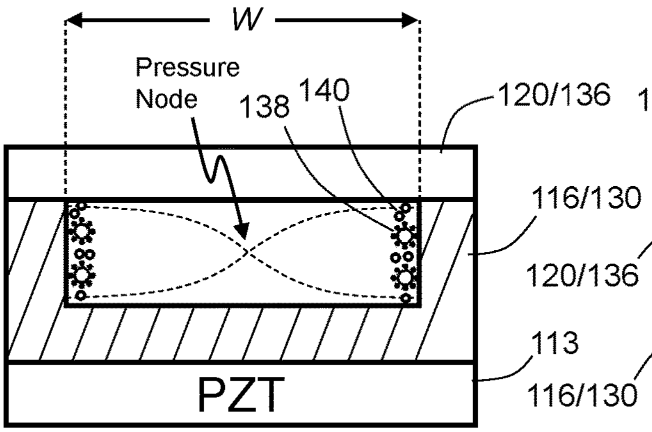
FIGS. 1D and 1E are cross-sectional views of the microfluidic device at the upstream end of the fluidic channel illustrating alternative positions for attachment of piezoelectric transducers.

FIG. 1D shows the cross section of the microfluidic device 100 near the upstream end of the main channel 102 in accordance with an embodiment of the present invention. In the drawing, numerals 113, 116, 120, 130, and 136-140 denote the same components as those shown in FIGS. 1A-1C. Referring now to FIG. 1D, the first piezoelectric transducer 113 in the form of a lead zirconate titanate (PZT) transducer is attached to the exterior or bottom surface of the substrate 116/130. The first piezoelectric transducer 113 may alternatively comprise any suitable piezoelectric material, such as but not limited to potassium niobate, sodium niobate, sodium tungstate, zinc oxide, bismuth ferrite, bismuth titanate, polyvinylidene fluoride, polyvinylidene chloride, polyimide, or any combination thereof. The first piezoelectric transducer 113 may be permanently or irreversibly attached to the bottom surface of the substrate 116/130 by soldering or an adhesive, such as but not limited to epoxy, cyanoacrylate, methacrylate, or any combination thereof.

The first piezoelectric transducer 113 may receive power in the form of an oscillating voltage with a frequency in the range of 100 kHz to 100 MHz to generate acoustic pressure waves in the main channel 102 between two sidewalls when a liquid is present therein. An acoustic standing wave may form in the main channel 102 when the channel width, W, is an integer multiple of one-half wavelength of the acoustic pressure wave, which may depend on the excitation frequency of the power applied to the first piezoelectric transducer 113 and the compressibility and density of the liquid in the main channel 102. FIG. 1D shows that an acoustic standing wave having a half wavelength of W is formed between the two sidewalls of the main channel 102, which results in the formation of single acoustic pressure node at the center of the main channel 102.

Figure 1E:
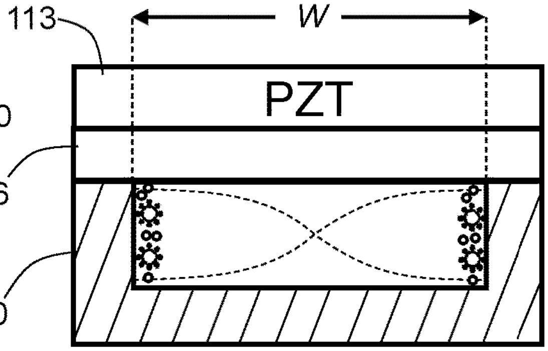

The first piezoelectric transducer 113 may alternatively be attached to the exterior or top surface of the substrate cover 120/136 as shown in FIG. 1E by soldering or an adhesive, such as but not limited to epoxy, cyanoacrylate, methacrylate, or any combination thereof.

Figure 1F:
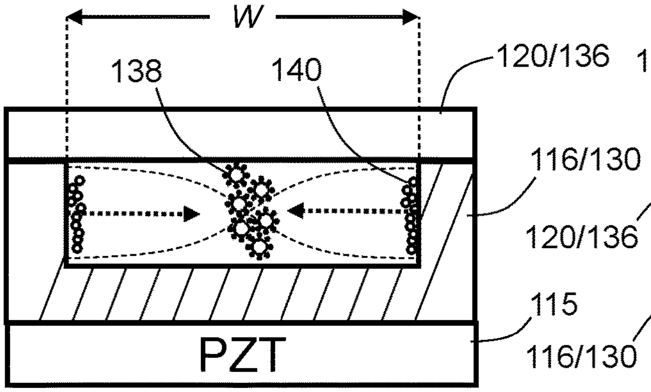
FIGS. 1F and 1G are cross-sectional views of the microfluidic device at the downstream end of the fluidic channel illustrating alternative positions for attachment of piezoelectric transducers.

FIG. 1F shows the cross section of the microfluidic device 100 near the downstream end of the main channel 102 in accordance with an embodiment of the present invention. In the drawing, numerals 115, 116, 120, 130, and 136-140 denote the same components as those shown in FIGS. 1A-1C. Referring now to FIG. 1F, the second piezoelectric transducer 115 in the form of a lead zirconate titanate (PZT) transducer is attached to the exterior or bottom surface of the substrate 116/130. The second piezoelectric transducer 115 may alternatively comprise any suitable piezoelectric material described above for the first piezoelectric transducer 113. The second piezoelectric transducer 115 may be permanently or irreversibly attached to the bottom surface of the substrate 116/130 by soldering or an adhesive as described above.

Like the first piezoelectric transducer 113, the second piezoelectric transducer 115 may receive power in the form of an oscillating voltage with a frequency in the range of 100 kHz to 100 MHz to generate acoustic pressure waves in the main channel 102 between two sidewalls when a liquid is present therein. FIG. 1F shows that an acoustic standing wave having a half wavelength of W is formed between the two sidewalls of the main channel 102, which results in the formation of single acoustic pressure node at the center of the main channel 102.

Figure 1G:
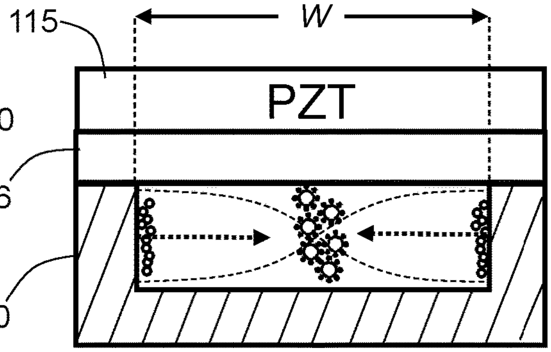

The second piezoelectric transducer 115 may alternatively be attached to the exterior or top surface of the substrate cover 120/136 as shown in FIG. 1G by soldering or an adhesive, such as but not limited to epoxy, cyanoacrylate, methacrylate, or any combination thereof.

Both of the first and second piezoelectric transducers 113 and 115 may be attached to the bottom surface of the substrate 116/130 or the top surface of the substrate cover 120/136. Alternatively, one of the piezoelectric transducers 113 and 115 may be attached to the bottom surface of the substrate 116/130 while the other one may be attached to the top surface of the substrate cover 120/136.

FIGS. 1D and 1E further show that the particles or biological entities 138 and 140 from the second input fluid 128 flowing along the two sidewalls of the main channel 102 near the upstream end thereof as the second input fluid 128 is being introduced into the main channel 102 via the two side input channels 108. The acoustic radiation pressure may drive the large particles or biological entities 138 towards the pressure node at the center of the main channel 102. By the time the particles or biological entities 138 and 140 reach the downstream end of the main channel 102, as shown in FIGS. 1F and 1G, the large particles or biological entities 138 have mostly move to the center of the main channel 102 while the small particles or biological entities 140 mostly remain close to the sidewalls, thereby allowing the small particles or biological entities 140 to be diverted from the main channel 102 via the two side output channels 114.

While FIG. 1A shows the microfluidic device 100 including two piezoelectric transducers 113 and 115, any number of piezoelectric transducers with each covering at least a portion of the main channel 102 may be used. For example, the two piezoelectric transducers 113 and 115 may be merged into a single piezoelectric transducer.

While FIGS. 1D-1G show the formation of single pressure node in the main channel 102, the microfluidic device 100 of the present invention may operate with multiple pressure nodes by adjusting the nominal width of the main channel 102 and/or the excitation frequency of the power applied to the piezoelectric transducer 113 and 115. In an embodiment, all piezoelectric transducers operate at the same frequency. In another embodiment, at least one of the piezoelectric transducers operates at a different frequency from others, resulting in a portion of the main channel 102 having a different number of pressure nodes from other portions. For example and without limitation, the first piezoelectric transducer 113 may operate at a double frequency compared to the second piezoelectric transducer 115, resulting in the upstream and downstream portions of the main channel 102 having two and one pressure node, respectively.

Operation of the microfluidic device 100 under the condition of single pressure node will now be described with reference to FIG. 2. In the drawing, numerals 102-114 denote the same components as those shown in FIG. 1A and the piezoelectric transducers are omitted for reasons of clarity. Referring now to FIG. 2, a fluid sample containing a first type of particles or biological entities 142 and a second type of particles or biological entities 144 is introduced into the side inlet port 106 while a buffer fluid 146 is introduced into the center inlet port 104. The first and second types of particles or biological entities 142 and 144 may have sufficiently different physical sizes and/or acoustic contrasts to allow them to be separated by acoustic radiation pressure. For example, the first type of particles or biological entities 142 may have a larger physical size, and/or a higher acoustic contrast, such as a higher mass density and/or a lower compressibility, thereby allowing the acoustic radiation pressure to push the first type of particles or biological entities 142 towards the pressure node located along the center of the main channel 102.

The fluid sample containing the first and second types of particles or biological entities 142 and 144 is introduced into the main channel 102 via the two side input channels 108 as two streams flowing near the sidewalls. The two streams of fluid sample in the main channel 102, which may behave like laminar flow, are interposed by the buffer fluid 146, which may act as a sheath fluid that may retard or prevent the movement of the second type of particles or biological entities 144 towards the pressure node along the center of the main channel 102. As the fluid sample progresses downstream in the main channel 102, the acoustic radiation pressure pushes the first type of particles or biological entities 142 towards the pressure node along the center of the main channel 102 while the second type of particles or biological entities 144 mostly remain close to the sidewalls. At the downstream end of the main channel 102, the first type of particles or biological entities 142 at the center exit the microfluidic device 100 through the center outlet port 110 and the second type of particles or biological entities 144 near the sidewalls are diverted to the side outlet port 112 through the side output channels 114.

Figure 2:
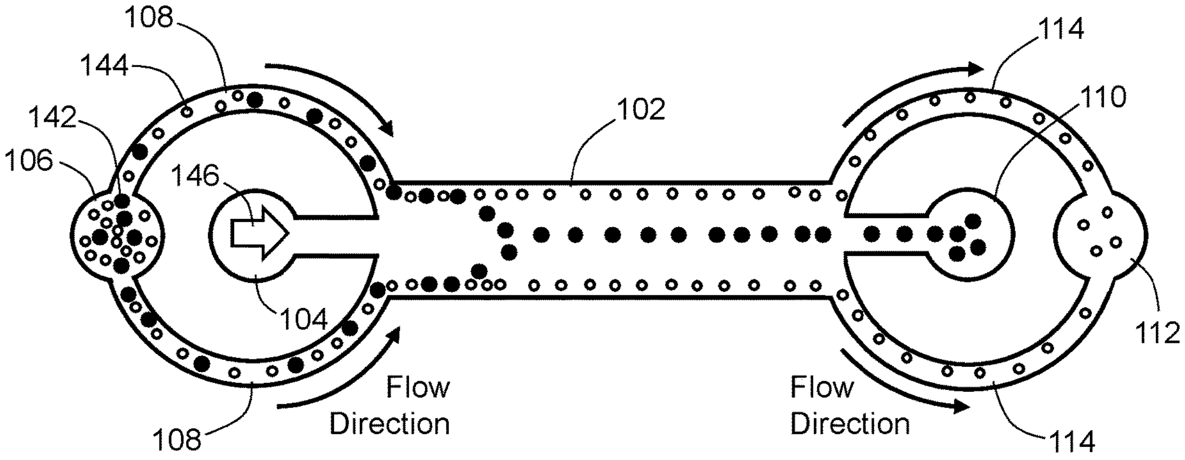
FIG. 2 illustrates operation of the microfluidic device under single pressure node condition.

The acoustic separation process illustrated in FIG. 2 may be sensitive to the power (e.g., voltage or current) applied to the piezoelectric transducers and the flow rate of the fluid sample containing the first and second types of particles or biological entities 142 and 144. Too high of power or too low of flow rate may cause some of the second type of particles or biological entities 144 to move into the center outlet port 110. The use of a buffer fluid with too low density and/or viscosity may also cause some of the second type of particles or biological entities 144 to move into the center outlet port 110. Conversely, too low of power or too high of flow rate may cause some of the first type of particles or biological entities 142 being diverted to the side outlet port 112 through the side output channels 114. The use of a buffer fluid with too high density and/or viscosity may also cause some of the first type of particles or biological entities 142 being diverted to the side outlet port 112.

Figure 3:
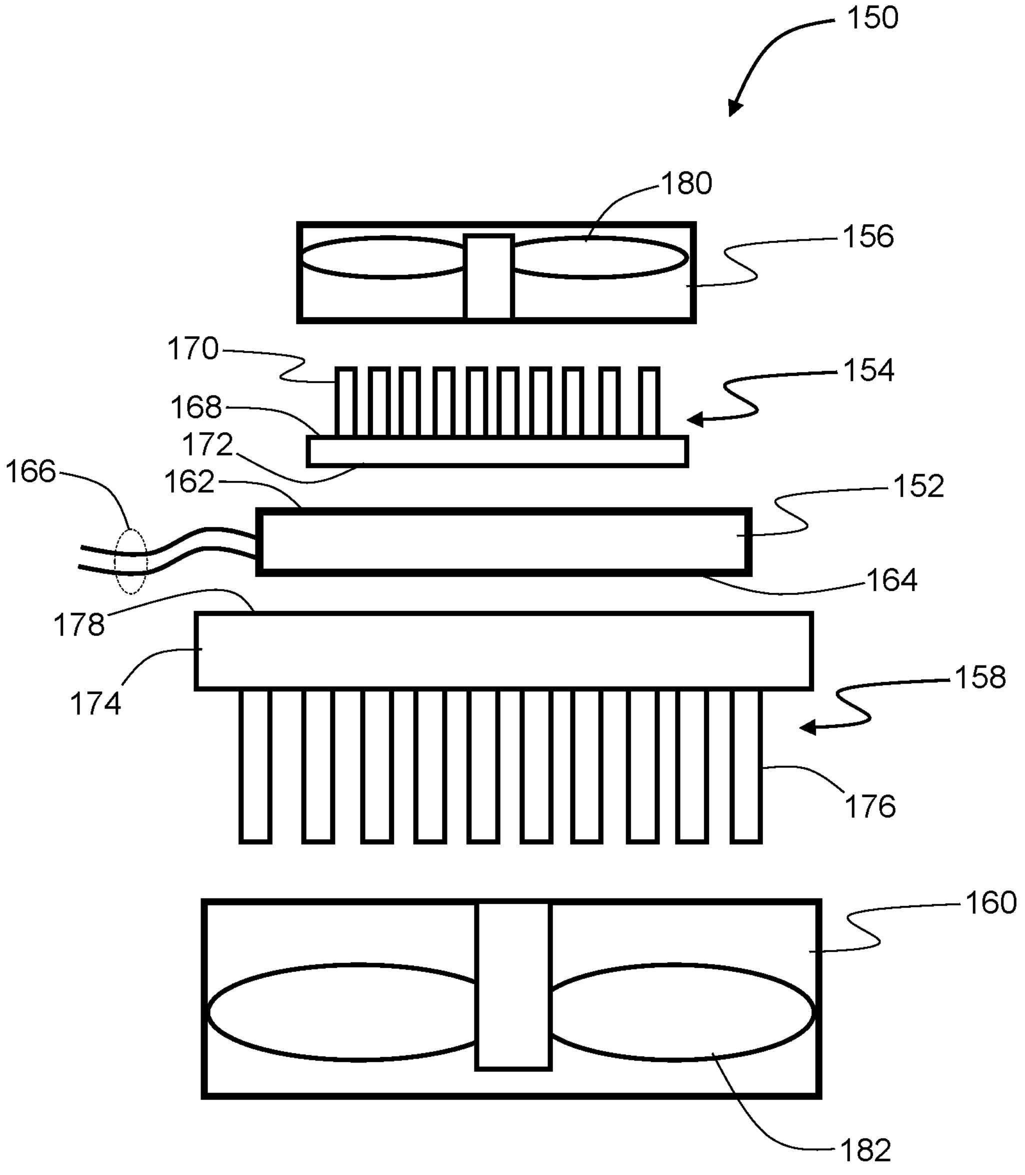
FIG. 3 illustrates components of a cooling device for cooling the microfluidic device in accordance with an embodiment of the present invention.

FIG. 3 illustrates components of a cooling device 150 in accordance with an embodiment of the present invention. The compact cooling device 150 may be used to cool any small electronic devices, especially the microfluidic device 100 incorporating one or more piezoelectric transducers 113 and 115 that generate heat during operation. The cooling device 150 includes a thermoelectric heat pump 152, which may operate via the Peltier effect, a first heat exchanger 154, a first cooling fan 156, a second heat exchanger 158, and a second cooling fan 160. The thermoelectric heat pump 152 may have a plate shape with a cool surface 162 and a hot surface 164 formed on opposite plate surfaces when a voltage is applied thereto through a set of wires 166, thereby causing heat to flow from the cool surface 162 to the hot surface 164. The first heat exchanger 154 may include a thermal conductor plate 168 with multiple convection fins 170 protruded from at least a surface thereof. Alternatively, the convection fins 170 may be replaced with convection pillars or other convection structures that cool the hot air passes therethrough. The thermal conductor plate 168 may act as a heat sink. A surface 172 of the first heat exchanger 154 opposite the surface with the fins 170 may be in contact with the cool surface 162 of the thermoelectric heat pump 152. Similarly, the second heat exchanger 158 may include a thermal conductor plate 174 with multiple convection fins 176 protruded from at least a surface thereof. The convection fins 176 may be replaced with convection pillars or other convection structures that can transfer heat to the air passes therethrough. The thermal conductor plate 174 of the second heat exchanger 158 may act as a heat sink. A surface 178 of the second heat exchanger 158 opposite the surface with the fins 176 may be in contact with the hot surface 164 of the thermoelectric heat pump 152. The first and second heat exchangers 154 and 158 may each be made of a metal or alloy with good thermal conductivity, such as but not limited to cooper, silver, aluminum, or any combination thereof. The first cooling fan 156, which may include multiple fan blades 180, may be disposed in close proximity to the fins 170 of the first heat exchanger 154 for pushing or drawing hot air through the convection fins 170 to cool the hot air. The second cooling fan 160, which may include multiple fan blades 182, may be disposed in close proximity to the fins 176 of the second heat exchanger 158 for pushing or drawing cool air through the hot fins 176 to cool them.

Figure 4:
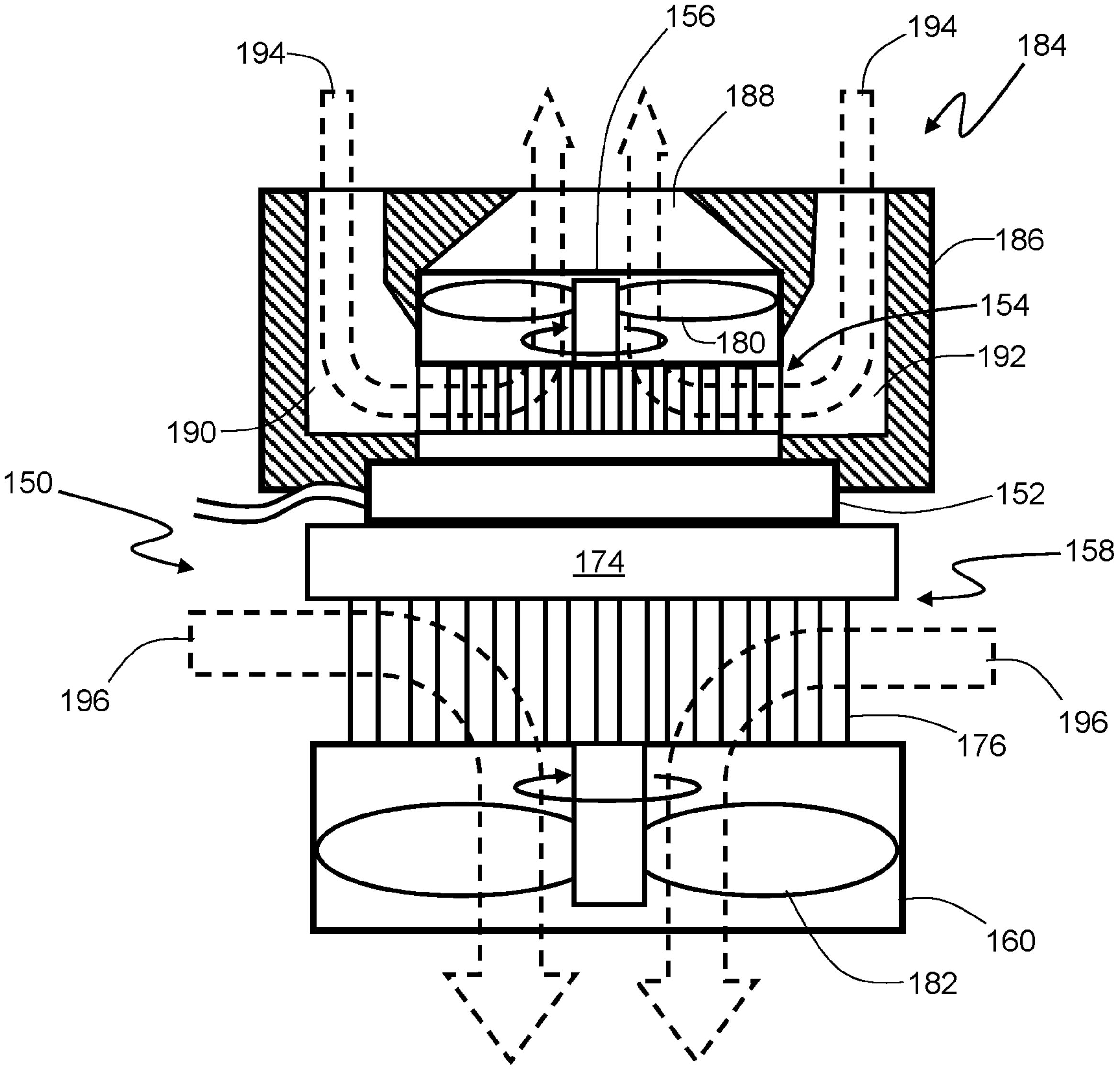
FIG. 4 is a cross-sectional view illustrating the cooling device of FIG. 3 partially enclosed by a lower housing structure in accordance with an embodiment of the present invention.

FIG. 4 shows that the cooling device 150 may be partially enclosed by and/or attached to a lower housing structure 184, which has a lower shell 186 that encases the first cooling fan 156 and the first heat exchanger 154. The lower housing structure 184 has a lower central cavity 188 that is open to the top of the lower housing structure 184 and is situated above the first cooling fan 156 to expose the first cooling fan 156 from the top of the lower housing structure 184. The lower central cavity 188 is formed adjacent to the first cooling fan 156 opposite the first heat exchanger 154. The lower housing structure 184 further includes two lower side cavities 190 and 192 that expose two sides of the first heat exchanger 154 to the top of the lower housing structure 184. The lower shell 186 may further partially or fully encase the thermoelectric heat pump 152. When the fan blades 180 of the first cooling fan 156 rotate, hot air may be drawn from the lower side cavities 190 and 192 through the fins 170 of the first heat exchanger 154 and expelled as cool air to the lower central cavity 188, as illustrated by the air flow 194. By reversing the rotation direction of the fan blades 180, the direction of the air flow 194 may be reversed such that the hot air enters the first heat exchanger 154 through the lower central cavity 188 and exits as cool air to the lower side cavities 190 and 192 instead. When the fan blades 182 of the second cooling fan 160 rotates, cool air may be drawn through the fins 176 of the second heat exchanger 158 from the sides thereof and expelled as hot air to the second cooling fan 160 disposed in close proximity to the fins 176 of the second heat exchanger 158, as illustrated by the air flow 196. By reversing the rotation direction of the fan blades 182, the direction of the air flow 196 may be reversed such that the cool air impinges on the fins 176 of the second heat exchanger 158 through the second cooling fan 160 and exits the second heat exchanger 158 as hot air through the sides thereof.

With continuing reference to FIG. 4, the first cooling fan 156 is in contact with the fins 170 of the first heat exchanger 154 in an embodiment. In another embodiment, the second cooling fan 160 is in contact with the fins 176 of the second heat exchanger 158. While FIG. 4 shows the first heat exchanger 154 in contact with the cool surface 162 of the thermoelectric heat pump 152, additional layers of thermal conductors or structures may be inserted between the first heat exchanger 154 and the thermoelectric heat pump 152. Likewise, additional layers of thermal conductors or structures may be inserted between the second heat exchanger 158 and the thermoelectric heat pump 152.

Figure 5:
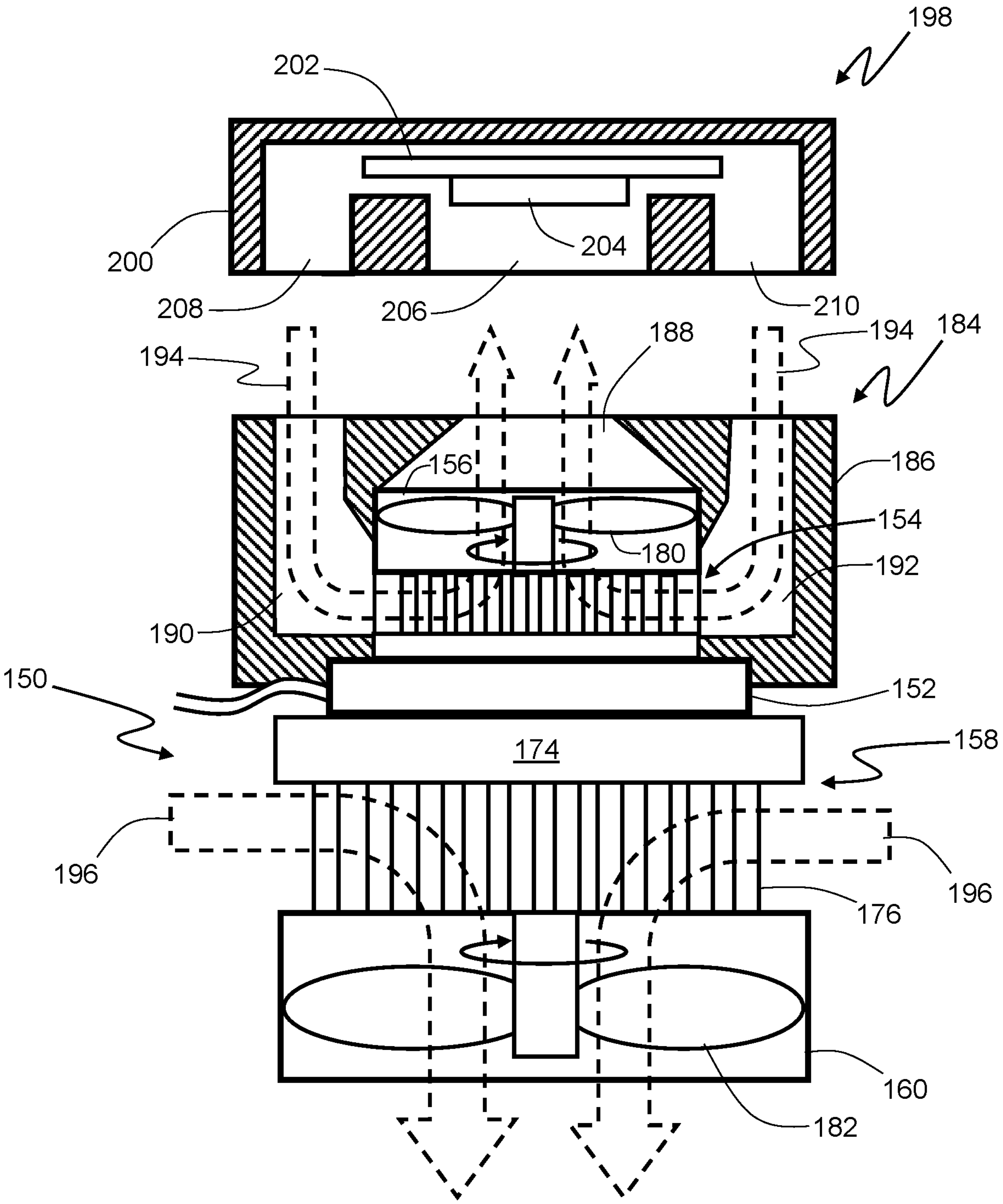
FIG. 5 is a cross-sectional view illustrating an upper housing structure that can be reversibly attached to the lower housing structure in accordance with an embodiment of the present invention.

FIG. 5 shows an upper housing structure 198 having an upper shell 200 that encloses therein a microfluidic device 202 in the form of an elongated strip of chip and a heat generating component 204 that could benefit from active cooling during operation. For example and without limitation, the microfluidic device 202 may be analogous to the microfluidic device 100 shown in FIGS. 1A-1G. The microfluidic device 202 in the form of a chip may be supported at two ends thereof and may have a length of 30-150 mm. The heat generating component 204 may be a vibration source that generates or dissipates heat during operation, such as but not limited to piezoelectric transducer. Alternatively, the heat generating component 204 may be one of any active devices or components that generate heat during operation, such as but not limited to optical detector, central process unit (CPU), laser, electronic controller, actuator, and voice coil. While the heat generating component 204 is depicted as single component in FIG. 5, the component 204 may represent several discrete components or a cluster of components attached to the microfluidic device 202. The microfluidic device 202 and the heat generating component 204 may be replaced by any heat-generating electronic device that requires active cooling during operation.

The upper housing structure 198 shown in FIG. 5 has an upper central cavity 206 that exposes the microfluidic device 202 and the heat generating component 204 to the atmosphere and two upper side cavities 208 and 210 that expose two ends of the microfluidic device 202 along the length thereof to the atmosphere. The upper housing structure 198 may further include electrical contacts (not shown) on the exterior for connection to external power source and electrical wires connecting the electrical contacts to the microfluidic device 202 and/or the heat generating component 204. The upper housing structure 198 may still further include ports (not shown) on the exterior and fluid tubes (not shown) connecting the ports to the microfluidic device 202 for introducing fluid samples into the microfluidic device 202 and extracting processed fluid samples from the same device 202.

Figure 6:
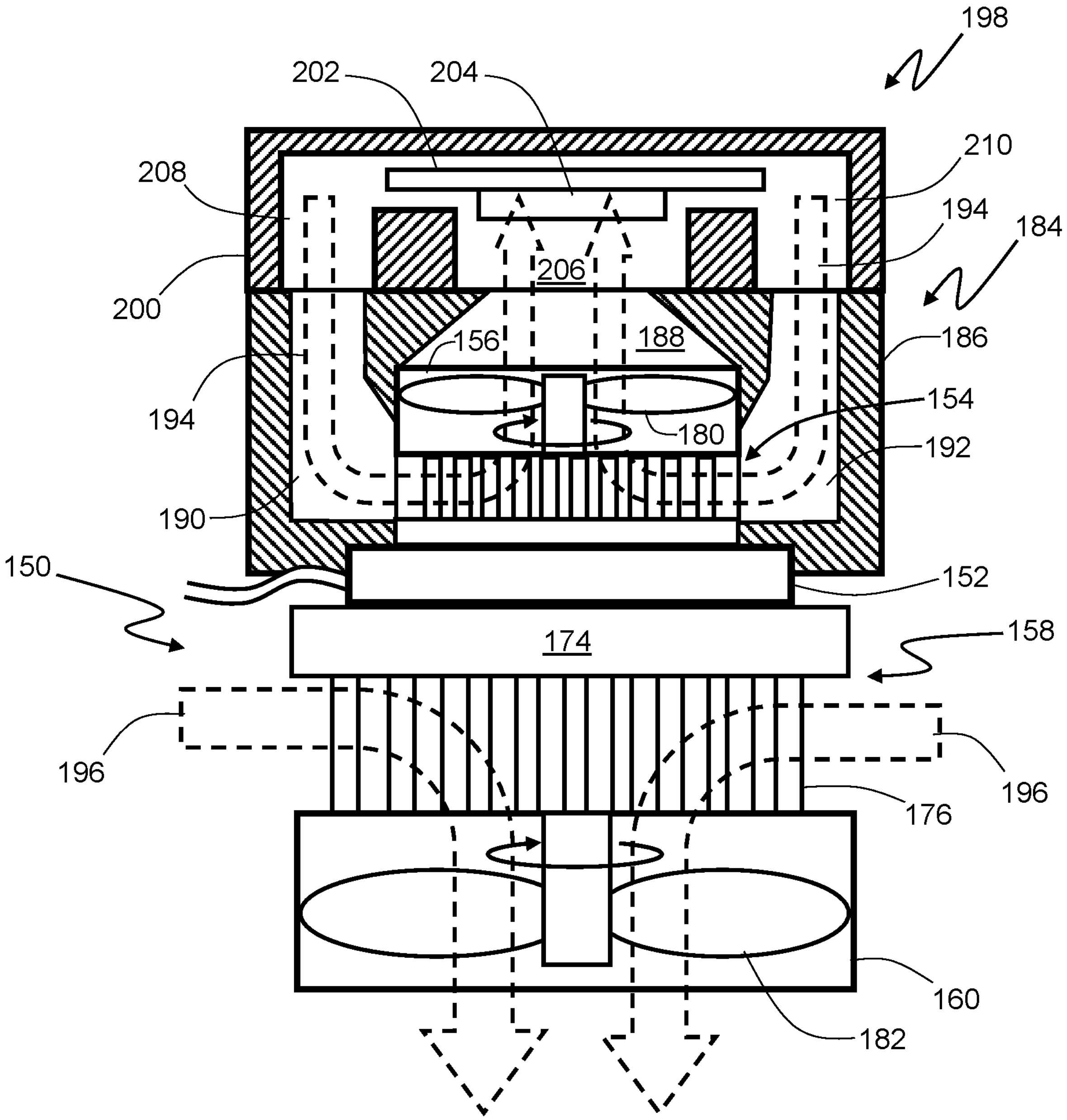
FIG. 6 illustrates coupling of the upper and lower housing structures for forming a central air passage and two side air passages to allow air circulation therebetween.

The upper housing structure 198 may be designed to be reversibly attached to the lower housing structure 184 as shown in FIGS. 5 and 6. The upper housing structure 198 may be attached to the lower housing structure 184 by any reversible latching mechanism (not shown), such as but not limited to magnetic latching or mechanical clip. When the two housing structures 184 and 198 are coupled as shown in FIG. 6, the upper central cavity 206 aligns with the lower central cavity 188 to form a central air passage between the first cooling fan 156 and the assembly of the microfluidic device 202 and the heat generating component 204, and the two upper side cavities 208 and 210 respectively align with the two lower side cavities 190 and 192 to form two side air passages between the two sides of the first heat exchanger 154 and the two ends of the microfluidic device 202. The coupling of the upper and lower housing structures 198 and 184 may hermetically seal therein the microfluidic device 202, the heat generating component 204, the first cooling fan 156, and at least the convection fins 170 of the first heat exchanger 154. The first cooling fan 156 pushes cool air through the central air passage to the surfaces of the heat generating component 204 and the microfluidic device 202 to cool them via convection, after which the air is heated and flows back to the first heat exchanger 154 through the side air passages, as shown by the air flow 194. The heated air is again cooled via convection when passing through the fins 170 of the first heat exchanger 154 and circulates back to the first cooling fan 156 as cool air. Therefore, the heat generated by the heat generating component 204 is transferred to the first heat exchanger 154 by convection with air circulating between the central air passage and the two side air passages.

Each of the microfluidic device 202 and the heat generating component 204 may be disposed in such a way that the largest surface faces the incoming cool air from the first cooling fan 156 to maximize the cooling efficiency. In an embodiment, the heat generating component 204 is disposed between the microfluidic device 202 and the first cooling fan 156, thereby allowing the heat generating component 204 to be directly cooled by the incident air flow from the first cooling fan 156.

By reversing the rotation direction of the fan blades 180 of the first cooling fan 156, the circulating air flow 194 may be reversed such that the cool air exiting the sides of the first heat exchanger 154 flows towards the assembly of the microfluidic device 202 and the heat generating component 204 through the side air passages formed from the upper and lower side cavities 208, 210,190, and 192. The cool air is heated by the assembly of the microfluidic device 202 and the heat generating component 204 via convection and returns to the first cooling fan 156 through the central air passage and then to the first heat exchanger 154, where the heated air is cooled again via convection.

After passing through the first heat exchanger 154, the cool air enclosed in the upper and lower housing structures 198 and 184 may have a lower temperature than the ambient air outside the housing structures 198 and 184 during operation. Prior to entering the first heat exchanger 154, the hot air enclosed in the upper and lower housing structures 198 and 184 may have a higher temperature than the ambient air outside the housing structures 198 and 184 during operation With continuing reference to FIG. 6, the heat generated by the assembly of the microfluidic device 202 and the heat generating component 204 is transferred to the first heat exchanger 154 via convection. The thermoelectric heat pump 152 then transfers the heat from the first heat exchanger 154 to the second heat exchanger 158, where the heat is eventually dissipated to the surrounding air via convection through the convection fins 176.

Once installed, the assembly of the microfluidic device 202 and the heat generating component 204 may permanently reside within the upper housing structure 198. Therefore, when changing the microfluidic device 202 and the heat generating component 204, the detachable upper housing structure 198 can be simply swapped out for another one. The modular approach of the present invention has several other advantages. The coupling of the upper and lower housing structures 198 and 184 insulates the microfluidic device 202 and the heat generating component 204 from the surrounding air, which may be heated by other devices or components. Moreover, the relatively small air volume enclosed by the housing structures 198 and 184 eliminates or minimizes the condensation issue caused by humidity.

Figure 7:
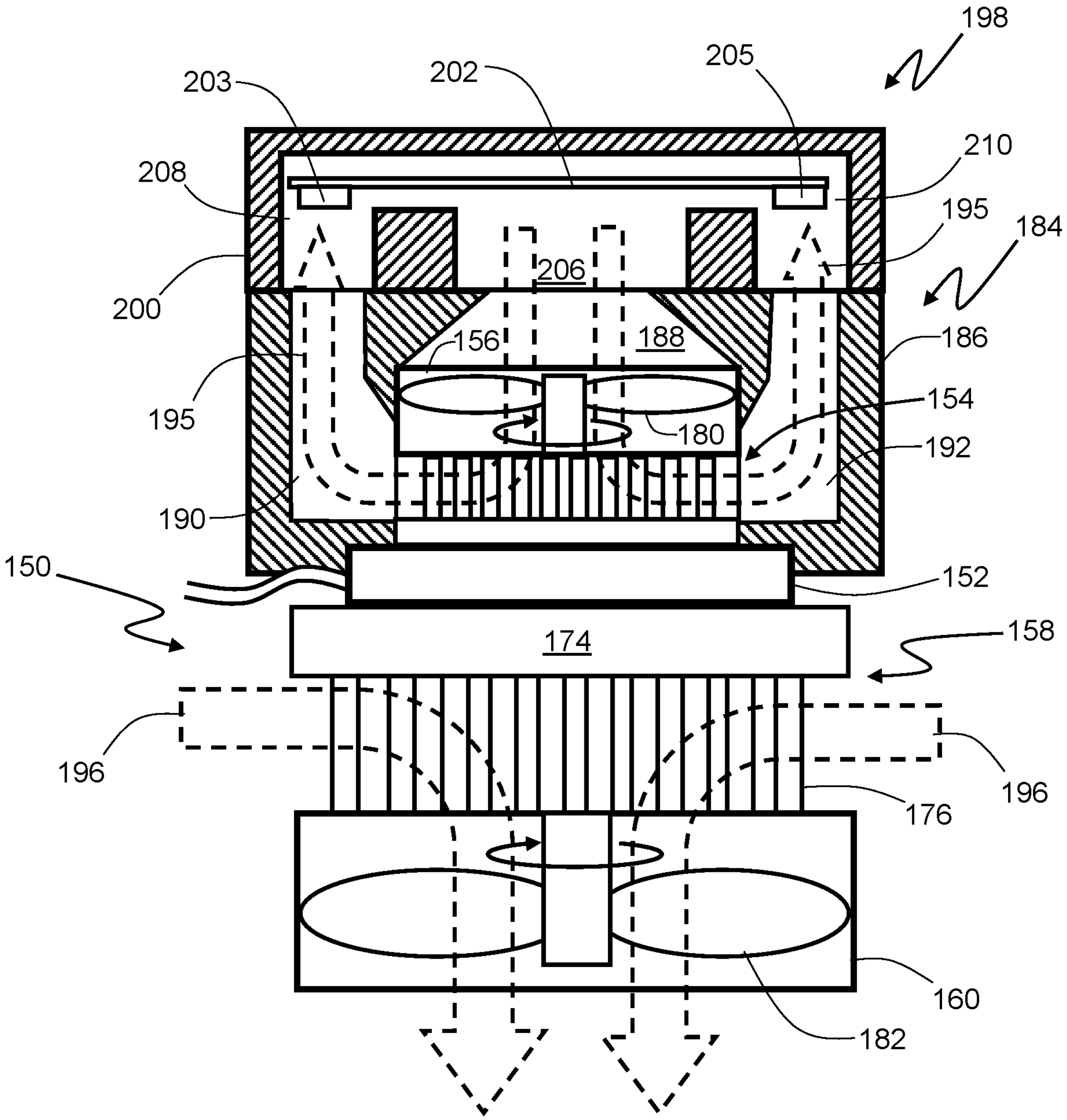
FIG. 7 is a cross-sectional view illustrating an alternative arrangement of the microfluidic device and the heat generating components in the upper housing structure shown in FIG. 6.

FIG. 7 shows the detachable upper housing structure 198 may accommodate a different assembly of the microfluidic device 202 and heat generating components 203 and 205. The heat generating components 203 and 205 are attached to the two ends of the microfluidic device 202, which are exposed to the side air passages formed from the upper and lower side cavities 208, 210,190, and 192. Therefore, the cool air exiting the sides of the first heat exchanger 154, as propelled by the first cooling fan 156, may flow towards the heat generating components 203 and 205 through the two side air passages, as shown by the circulating air flow 195. The cool air is heated by the heat generating components 203 and 205 via convection and returns to the first cooling fan 156 through the central air passage and then to the first heat exchanger 154, where the heated air is cooled again via convection.

Each of the heat generating components 203 and 205 may be a vibration source that generates or dissipates heat during operation, such as but not limited to piezoelectric transducer. Alternatively, each of the heat generating components 203 and 205 may be one of any active devices or components that generate heat during operation, such as but not limited to optical detector, central process unit (CPU), laser, electronic controller, actuator, and voice coil. The microfluidic device 202 and the heat generating components 203 and 205 may be replaced by any heat-generating electronic device that requires active cooling during operation.

Figure 8:
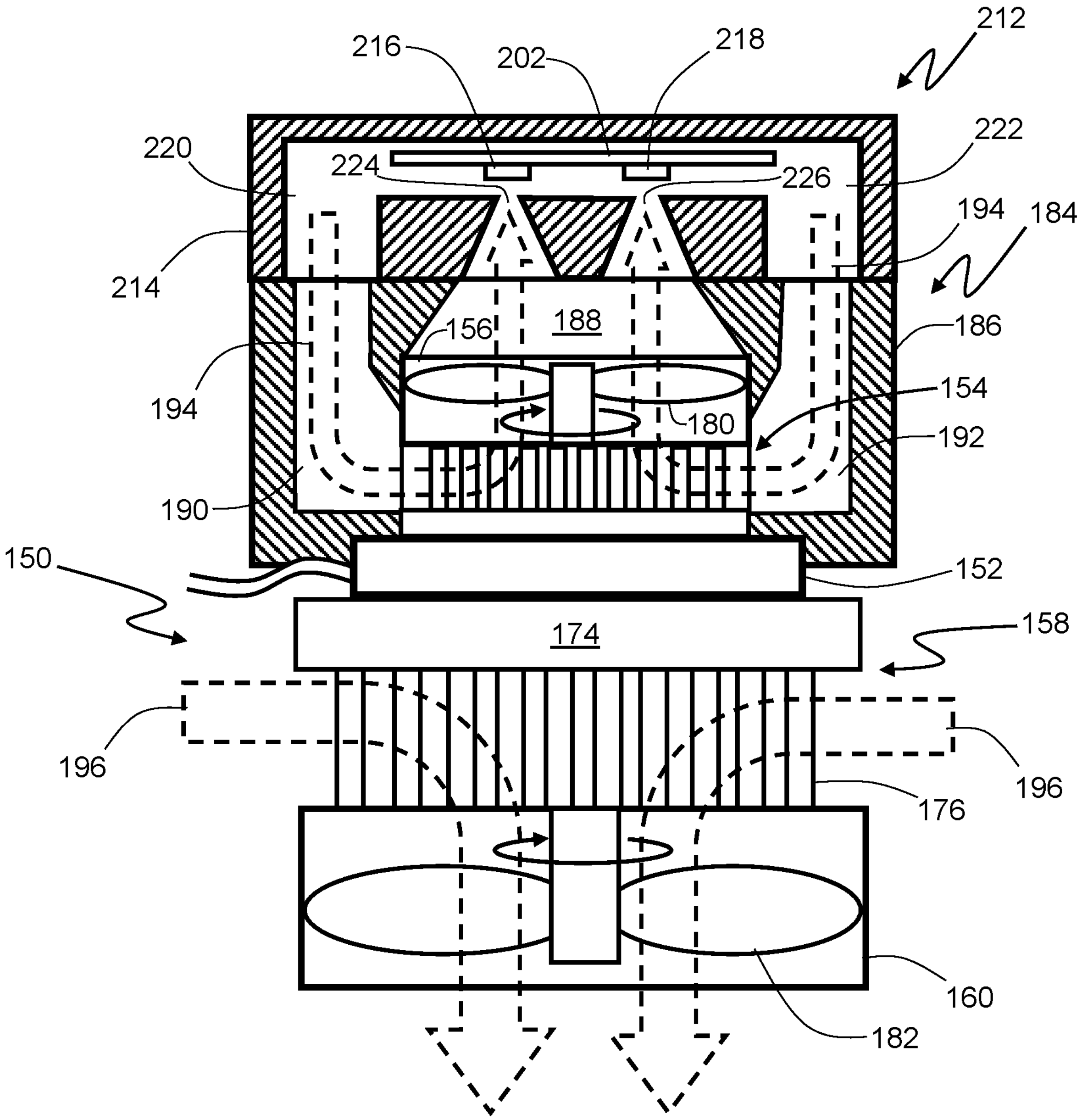
FIG. 8 is a cross-sectional view illustrating another upper housing structure that can be reversibly attached to the lower housing structure in accordance with an embodiment of the present invention.

The detachable upper housing structure 198 may be modified to accommodate different microfluidic devices and/or different heat generating components. For example, FIG. 8 shows another detachable upper housing structure 212 having an upper shell 214 containing therein two heat generating devices 216 and 218 attached to the microfluidic device 202 at two different locations along the length of the microfluidic device 202. Like the upper housing structure 198 shown in FIG. 6, the upper housing structure 212 has two upper side cavities 220 and 222 that respectively align with the two lower side cavities 190 and 192 of the lower housing structure 184 to form two side air passages between two ends of the microfluidic device 202 and two sides of the first heat exchanger 154 when the two housing structures 212 and 184 are coupled. The upper housing structure 212 further includes two upper central openings or cavities 224 and 226 that are respectively aligned to the two heat generating components 216 and 218 at one end and to the lower central cavity 188 at the other end, thereby dividing the cool air from the first cooling fan into two streams focusing on the two heat generating components 216 and 218. Each of the heat generating components 216 and 218 may be a vibration source that generates or dissipates heat during operation, such as but not limited to piezoelectric transducer. Alternatively, each of the heat generating components 216 and 218 may be one of any active devices or components that generate heat during operation, such as but not limited to optical detector, central process unit (CPU), laser, electronic controller, actuator, and voice coil. The microfluidic device 202 and the heat generating components 216 and 218 may be replaced by any heat-generating electronic device that requires active cooling during operation.

During operation, the first cooling fan 156 pushes cool air through the lower central cavity 188 and the two upper central cavities 224 and 226 to the surfaces of the heat generating components 216 and 218 and the microfluidic device 202 to cool the components 216 and 218 and device 202 via convection, after which the air is heated and flows back to the first heat exchanger 154 through the two side air passages, as shown by the air flow 194. The heated air is again cooled via convection when passing through the fins 170 of the first heat exchanger 154 and circulates back to the first cooling fan 156 as cool air. Each of the microfluidic device 202 and the heat generating components 216 and 218 may be disposed in such a way that the largest surface faces the incoming cool air from the first cooling fan 156 to maximize the cooling efficiency. In an embodiment, the heat generating components 216 and 218 are disposed between the microfluidic device 202 and the first cooling fan 156, thereby allowing the heat generating components 216 and 218 to be directly cooled by the incident air flow from the first cooling fan 156.

Figure 9:
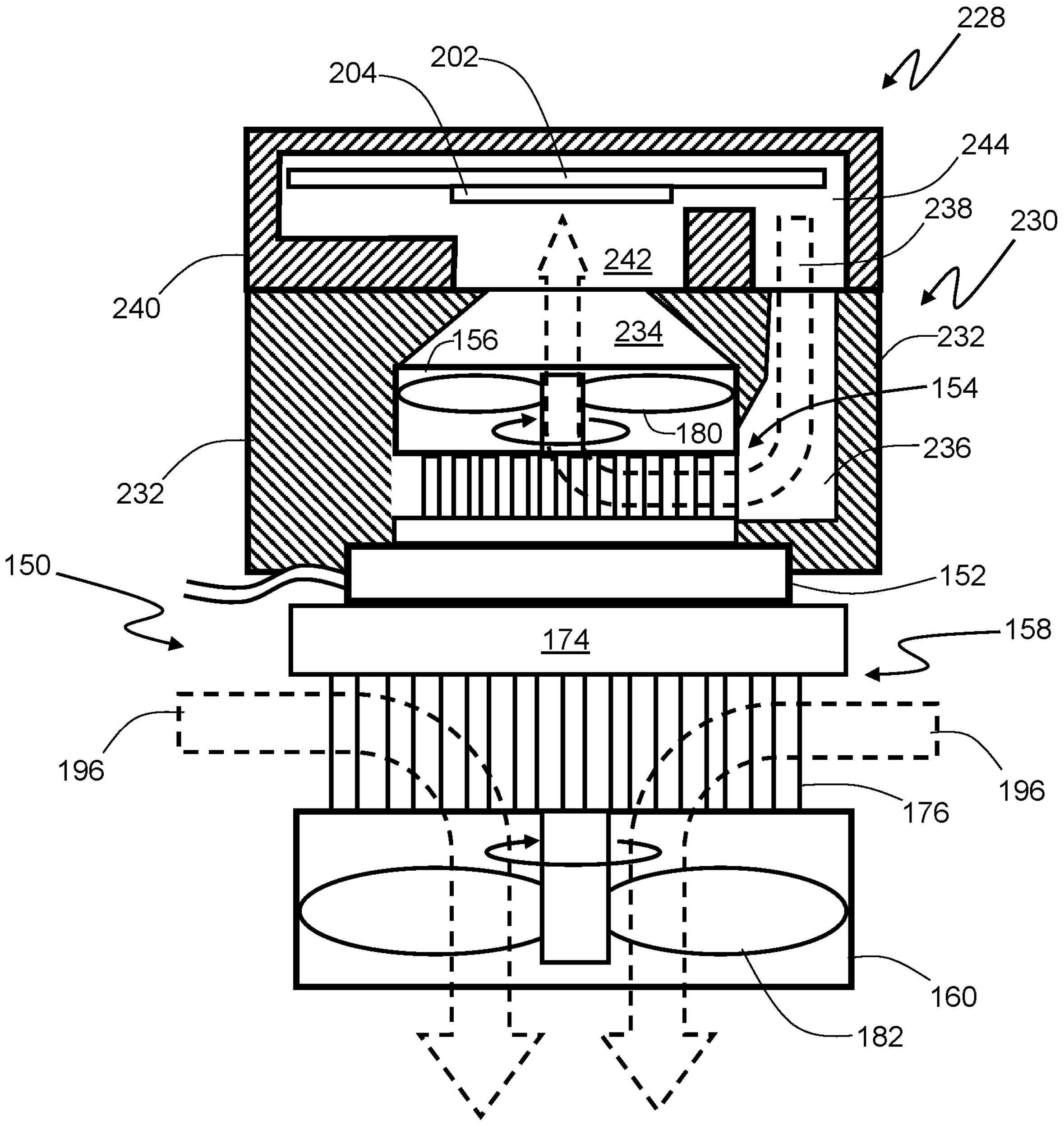
FIG. 9 is a cross-sectional view illustrating reversibly coupling of an upper housing structure and a lower housing structure for forming a central air passage and a side air passage for allowing air to circulate therebetween in accordance with another embodiment of the present invention.

FIG. 9 is a cross-sectional view illustrating an upper housing structure 228 that may be reversibly attached to a lower housing structure 230 in accordance with another embodiment of the present invention. The cooling device 150 may be partially enclosed by and/or attached to the lower housing structure 230, which has a lower shell 232 that encases the first cooling fan 156 and the first heat exchanger 154. The lower housing structure 230 has a lower central cavity 234 that is formed adjacent to the first cooling fan 156 opposite the first heat exchanger 154 and is open to the top of the lower housing structure 230, thereby exposing the first cooling fan 156 from the top of the lower housing structure 230. The lower housing structure 230 further includes a lower side cavity 236 formed adjacent to a side of the first heat exchanger 154. The lower side cavity 236 is open to the top of the lower housing structure 230 and thus exposes the side of the first heat exchanger 154 from the top of the lower housing structure 230. The lower shell 232 may further partially or fully encase the thermoelectric heat pump 152. When the fan blades 180 of the first cooling fan 156 rotate, hot air may be drawn from the lower side cavity 236 through the fins 170 of the first heat exchanger 154 and expelled as cool air to the lower central cavity 234, as illustrated by the air flow 238.

With continuing reference to FIG. 9, the upper housing structure 228 has an upper shell 240 that encloses therein the microfluidic device 202 in the form of an elongated strip of chip and the heat generating component 204 that could benefit from active cooling during operation. For example and without limitation, the microfluidic device 202 may be analogous to the microfluidic device 100 shown in FIGS. 1A-1G. The microfluidic device 202 in the form of a chip may be supported at two ends thereof and may have a length of 30-150 mm. The heat generating component 204 may be a vibration source that generates or dissipates heat during operation, such as but not limited to piezoelectric transducer. Alternatively, the heat generating component 204 may be one of any active devices or components that generate heat during operation, such as but not limited to optical detector, central process unit (CPU), laser, electronic controller, actuator, and voice coil. The microfluidic device 202 and the heat generating component 204 may be replaced by any heat-generating electronic device that can benefit from active cooling during operation.

The upper housing structure 228 has an upper central cavity 242 that may be formed adjacent to the heat generating component 204 and is open to the bottom of the upper housing structure 228, thereby exposing the microfluidic device 202 and the heat generating component 204 from the bottom of the upper housing structure 228. The upper housing structure 228 further includes an upper side cavity 244 that exposes one end of the microfluidic device 202 along the length thereof to the bottom of the upper housing structure 228. The upper housing structure 228 may further include electrical contacts (not shown) on the exterior for connection to external power source and electrical wires connecting the electrical contacts to the microfluidic device 202 and/or the heat generating component 204. The upper housing structure 228 may still further include ports (not shown) on the exterior and fluid tubes (not shown) connecting the ports to the microfluidic device 202 for introducing fluid samples into the microfluidic device 202 and extracting processed fluid samples from the same device 202.

The upper housing structure 228 may be designed to be reversibly attached to the lower housing structure 230. The upper housing structure 228 may be attached to the lower housing structure 230 by any reversible latching mechanism, such as but not limited to magnetic latching or mechanical clip. When the two housing structures 228 and 230 are coupled as shown in FIG. 9, the upper central cavity 242 aligns with the lower central cavity 234 to form a central air passage between the first cooling fan 156 and the assembly of the microfluidic device 202 and the heat generating component 204, and the upper side cavity 244 aligns with the lower side cavity 236 to form a side air passage between one side of the first heat exchanger 154 and one end of the microfluidic device 202. The coupling of the upper and lower housing structures 228 and 230 may hermetically seal therein the microfluidic device 202, the heat generating component 204, the first cooling fan 156, and at least the convection fins 170 of the first heat exchanger 154. The first cooling fan 156 pushes cool air through the central air passage to the surfaces of the heat generating component 204 and the microfluidic device 202 to cool them via convection, after which the air is heated and flows back to the first heat exchanger 154 through the side air passage, as shown by the air flow 238. The heated air is again cooled via convection when passing through the fins 170 of the first heat exchanger 154 and circulates back to the first cooling fan 156 as cool air. Therefore, the heat generated by the heat generating component 204 is transferred to the first heat exchanger 154 by convection with the air circulating between the central air passage and the side air passage.

Figure 10:
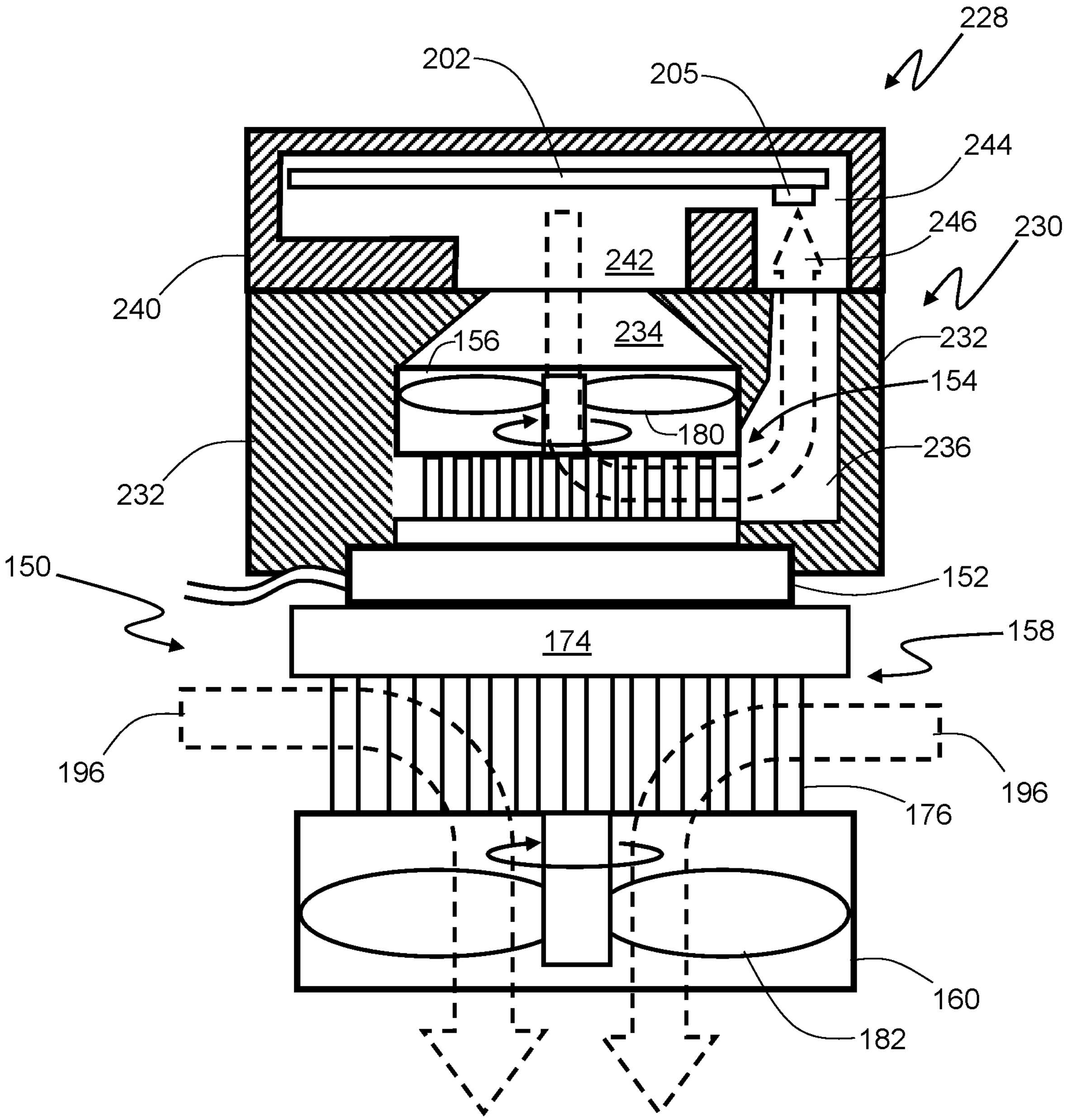
FIG. 10 is a cross-sectional view illustrating an alternative arrangement of the microfluidic device and the heat generating component in the upper housing structure shown in FIG. 9.
Figure 11:
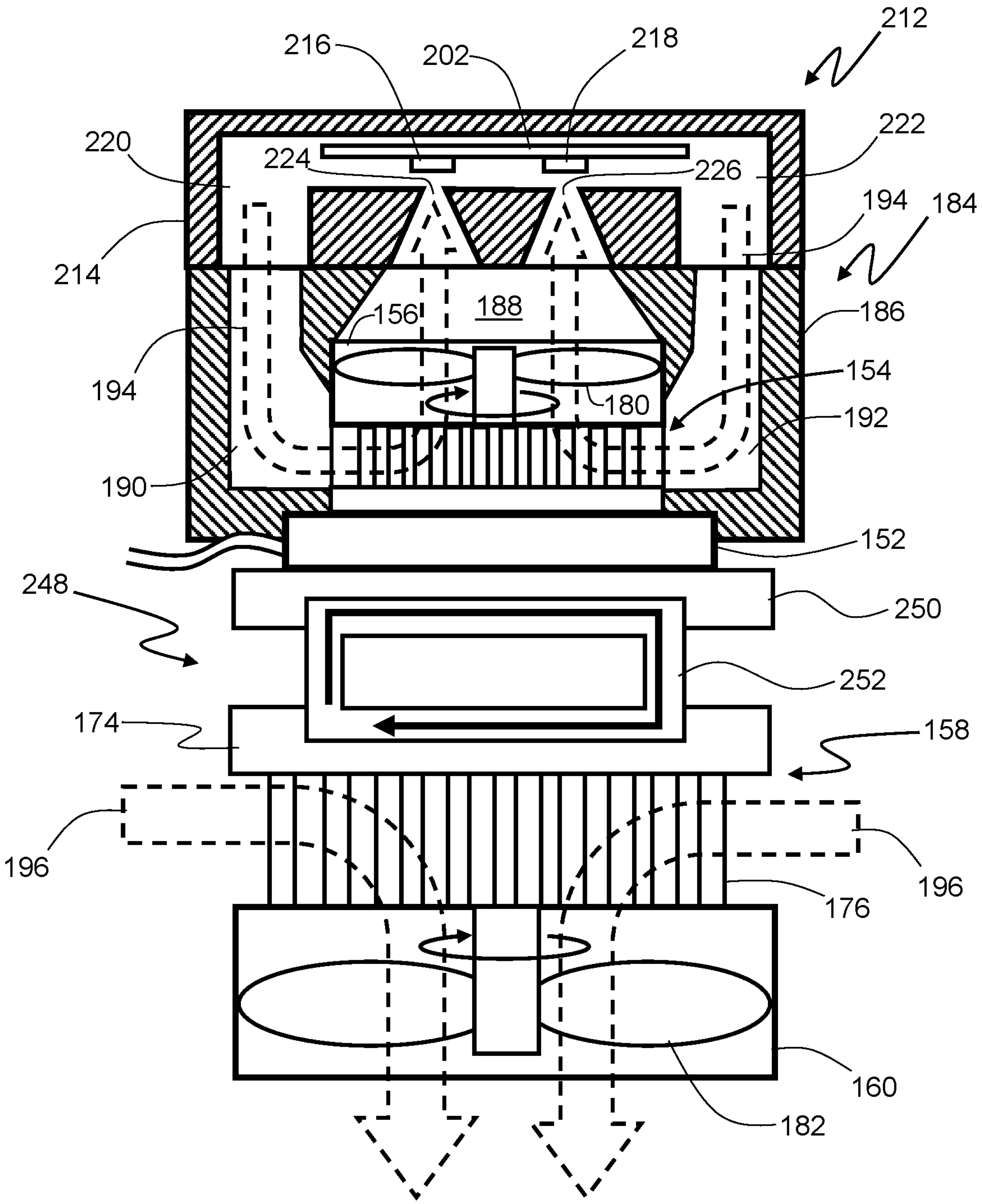
FIG. 11 illustrates another cooling device for cooling the microfluidic device in accordance with an embodiment of the present invention.

FIG. 10 shows that the heat generating component 205 may be attached to the microfluidic device 202 at one end thereof in the upper housing structure 228. In such an arrangement, the air flow 238 shown in FIG. 9 may be reversed such that the cool air exiting one side of the first heat exchanger 154, as propelled by the first cooling fan 156, may flow towards the heat generating component 205 through the side air passage formed from the upper and lower side cavities 236 and 244, as shown by the circulating air flow 246. The cool air is heated by the heat generating component 205 via convection and returns to the first cooling fan 156 through the central air passage and then to the first heat exchanger 154, where the heated air is cooled again via convection The cooling device 150 shown in FIGS. 3-10 may further include additional layers of thermal conductors or structures between the second heat exchanger 158 and the thermoelectric heat pump 152. FIG. 11 shows a cooling device 248, which is attached to the lower housing structure 184. The cooling device 248 differs from the cooling device 150 of FIGS. 3-10 in that a heat conduction plate 250 is in contact with the hot surface 164 of the thermoelectric heat pump 152 and a conductive pipe 252 is disposed in between the heat conduction plate 250 and the thermal conductor plate 174 of the second heat exchanger 158. A length of the conductive pipe 252 may be in contact with the heat conduction plate 250 and another length of the conductive pipe 252 may be in contact with the thermal conductor plate 174. The conductive pipe 252 may contain a fluid circulating therein to transfer heat between the heat conduction plate 250 and the second heat exchanger 158.

While the present invention has been shown and described with reference to certain preferred embodiments, it is to be understood that those skilled in the art will no doubt devise certain alterations and modifications thereto which nevertheless include the true spirit and scope of the present invention. For example, the microfluidic device and the heat generating components attached thereto may be replaced by other small electronic devices that require active cooling during operation. Thus the scope of the invention should be determined by the appended claims and their legal equivalents, rather than by examples given.

What is claimed is:

1. A microfluidic system for separating biological entities comprising:

a cooling device including a thermoelectric heat pump, a first fan, and a first heat exchanger disposed between the first fan and the thermoelectric heat pump;

a first housing structure having a first shell that encases the first fan and the first heat exchanger, the first housing structure having first and second cavities that respectively expose two sides of the first heat exchanger and a third cavity formed adjacent to the first fan opposite the first heat exchanger;

a microfluidic device and one or more piezoelectric transducers attached thereto; and a second housing structure reversibly attached to the first housing structure and having a second shell that encloses therein the microfluidic device and the one or more piezoelectric transducers, the second housing structure including fourth and fifth cavities that respectively expose two ends of the microfluidic device and a sixth cavity, wherein when the first and second housing structures are coupled, the first and second cavities are respectively aligned to the fourth and fifth cavities to form first and second air passages between the two sides of the first heat exchanger and the two ends of the microfluidic device, the third and sixth cavities are aligned to form a third air passage between the first fan and the one or more piezoelectric transducers, thereby allowing air to circulate between the third air passage and the first and second air passages, and wherein the microfluidic device and the one or more piezoelectric transducers attached thereto are hermetically sealed when the first and second housing structures are coupled.

2. The microfluidic system of claim 1, wherein the first heat exchanger includes a thermal conductor plate with multiple convection fins protruded therefrom.

3. The microfluidic system of claim 1, wherein the microfluidic device is in the form of an elongated strip of chip and is supported at the two ends thereof in the second housing structure.

4. The microfluidic system of claim 1, wherein the one or more piezoelectric transducers are directly cooled by incident air from the first fan.

5. The microfluidic system of claim 1, wherein heat generated by the one or more piezoelectric transducers is transferred to the first heat exchanger by convection of air circulating between the third air passage and the first and second air passages.

6. The microfluidic system of claim 1, wherein the microfluidic device includes a substrate with trenches formed therein and a lid covering the trenches, the one or more piezoelectric transducers being attached to the lid opposite the substrate.

7. The microfluidic system of claim 1, wherein the thermoelectric heat pump is a Peltier device.

8. The microfluidic system of claim 1, wherein the cooling device further comprises a second fan and a second heat exchanger disposed between the second fan and the thermoelectric heat pump.

9. The microfluidic system of claim 8, wherein the thermoelectric heat pump transfers heat from the first heat exchanger to the second heat exchanger.

10. A microfluidic system for separating biological entities comprising:

a cooling device including a thermoelectric heat pump, a first fan, and a first heat exchanger disposed between the first fan and the thermoelectric heat pump;

a first housing structure having a first shell that encases the first fan and the first heat exchanger, the first housing structure having a first cavity exposing a side of the first heat exchanger and a second cavity formed adjacent to the first fan opposite the first heat exchanger;

a microfluidic device and one or more piezoelectric transducers attached thereto; and a second housing structure reversibly attached to the first housing structure and having a second shell that encloses therein the microfluidic device and the one or more piezoelectric transducers, the second housing structure including a third cavity exposing an end of the microfluidic device and a fourth cavity, wherein when the first and second housing structures are coupled, the first and third cavities are aligned to form a first air passage between the side of the first heat exchanger and the end of the microfluidic device, the second and fourth cavities are aligned to form a second air passage between the first fan and the one or more piezoelectric transducers, thereby allowing air to circulate between the first and second air passages, and wherein the microfluidic device and the one or more piezoelectric transducers attached thereto are hermetically sealed when the first and second housing structures are coupled.

11. The microfluidic system of claim 10, wherein the first heat exchanger includes a thermal conductor plate with multiple convection fins protruded therefrom.

12. The microfluidic system of claim 10, wherein the microfluidic device is in the form of an elongated strip of chip and is supported at the two ends thereof in the second housing structure.

13. The microfluidic system of claim 10, wherein the one or more piezoelectric transducers are directly cooled by incident air from the first fan.

14. The microfluidic system of claim 10, wherein heat generated by the one or more piezoelectric transducers is transferred to the first heat exchanger by convection of air circulating between the first and second air passages.

15. The microfluidic system of claim 10, wherein the microfluidic device includes a substrate with trenches formed therein and a lid covering the trenches, the one or more piezoelectric transducers being attached to the lid opposite the substrate.

16. The microfluidic system of claim 10, wherein the thermoelectric heat pump is a Peltier device.

17. The microfluidic system of claim 10, wherein the cooling device further comprises a second fan and a second heat exchanger disposed between the second fan and the thermoelectric heat pump.

18. The microfluidic system of claim 17, wherein the thermoelectric heat pump transfers heat from the first heat exchanger to the second heat exchanger.

* * * * *